(12) United States Patent
Curry et al.

(10) Patent No.: US 11,949,821 B2
(45) Date of Patent: Apr. 2, 2024

(54) SYSTEM AND METHOD FOR ORDERING AND FACILITATING PAYMENT OF A PRINT PRODUCT INCLUDING A DIGITAL IMAGE

(71) Applicant: FUJIFILM North America Corporation, Valhalla, NY (US)

(72) Inventors: Nathan P. Curry, West Henrietta, NY (US); Ryan Moore, Rochester, NY (US)

(73) Assignee: FUJIFILM North America Corporation, Valhalla, NY (US)

( * ) Notice: Subject to any disclaimer, the term of this patent is extended or adjusted under 35 U.S.C. 154(b) by 0 days.

(21) Appl. No.: 18/163,910

(22) Filed: Feb. 3, 2023

(65) Prior Publication Data
US 2023/0188652 A1    Jun. 15, 2023

Related U.S. Application Data

(63) Continuation of application No. 17/516,117, filed on Nov. 1, 2021, now Pat. No. 11,575,798, which is a
(Continued)

(51) Int. Cl.
| | | |
|---|---|---|
| G06K 15/00 | (2006.01) | |
| G06Q 20/32 | (2012.01) | |
| H04N 1/00 | (2006.01) | |

(52) U.S. Cl.
CPC ....... *H04N 1/00188* (2013.01); *G06Q 20/322* (2013.01); *G06Q 20/3276* (2013.01);
(Continued)

(58) Field of Classification Search
CPC ........... H04N 1/00188; H04N 1/00143; H04N 1/00167; H04N 1/00169; G06Q 20/322; G06Q 20/3276
See application file for complete search history.

(56) References Cited

U.S. PATENT DOCUMENTS

| | | | |
|---|---|---|---|
| 10,728,400 B2 | 7/2020 | Curry et al. | |
| 2003/0038835 A1* | 2/2003 | DeFelice | G07F 17/40 |
| | | | 715/738 |

(Continued)

*Primary Examiner* — Moustapha Diaby
(74) *Attorney, Agent, or Firm* — Woods Oviatt Gilman LLP; Dennis B. Danella, Esq.

(57) ABSTRACT

A computer-implemented method programmed for execution in a computing environment for ordering and facilitating payment of a print product. The method comprises storing a digital image in a memory of the computing system; allowing for the selection of a print product using a user interface accessed by a user computing device to establish a print order, wherein the print product includes the digital image, and wherein the print order includes an identification of the selected print product and an order cost; generating a unique payment link by the processor that corresponds to the print order and provides a user computing device with access to communicate payment information to a remote payment processing system; providing access to the unique payment link to the user computing device; receiving a payment notification at the processor from the remote payment processing system; and allowing for fulfillment of the print order using a printing device.

22 Claims, 31 Drawing Sheets

Related U.S. Application Data continuation of application No. 16/909,363, filed on Jun. 23, 2020, now Pat. No. 11,172,077, which is a continuation of application No. 16/246,698, filed on Jan. 14, 2019, now Pat. No. 10,728,400.

(60) Provisional application No. 62/675,111, filed on May 22, 2018.

(52) U.S. Cl.
CPC ..... *H04N 1/00143* (2013.01); *H04N 1/00167* (2013.01); *H04N 1/00169* (2013.01)

(56) References Cited

U.S. PATENT DOCUMENTS

| | | | |
|---|---|---|---|
| 2004/0001189 A1* | 1/2004 | Oka | H04N 1/00132 355/41 |
| 2007/0005447 A1 | 1/2007 | Christ, Jr. et al. | |
| 2017/0243013 A1* | 8/2017 | Herlocher | G06F 21/606 |

\* cited by examiner

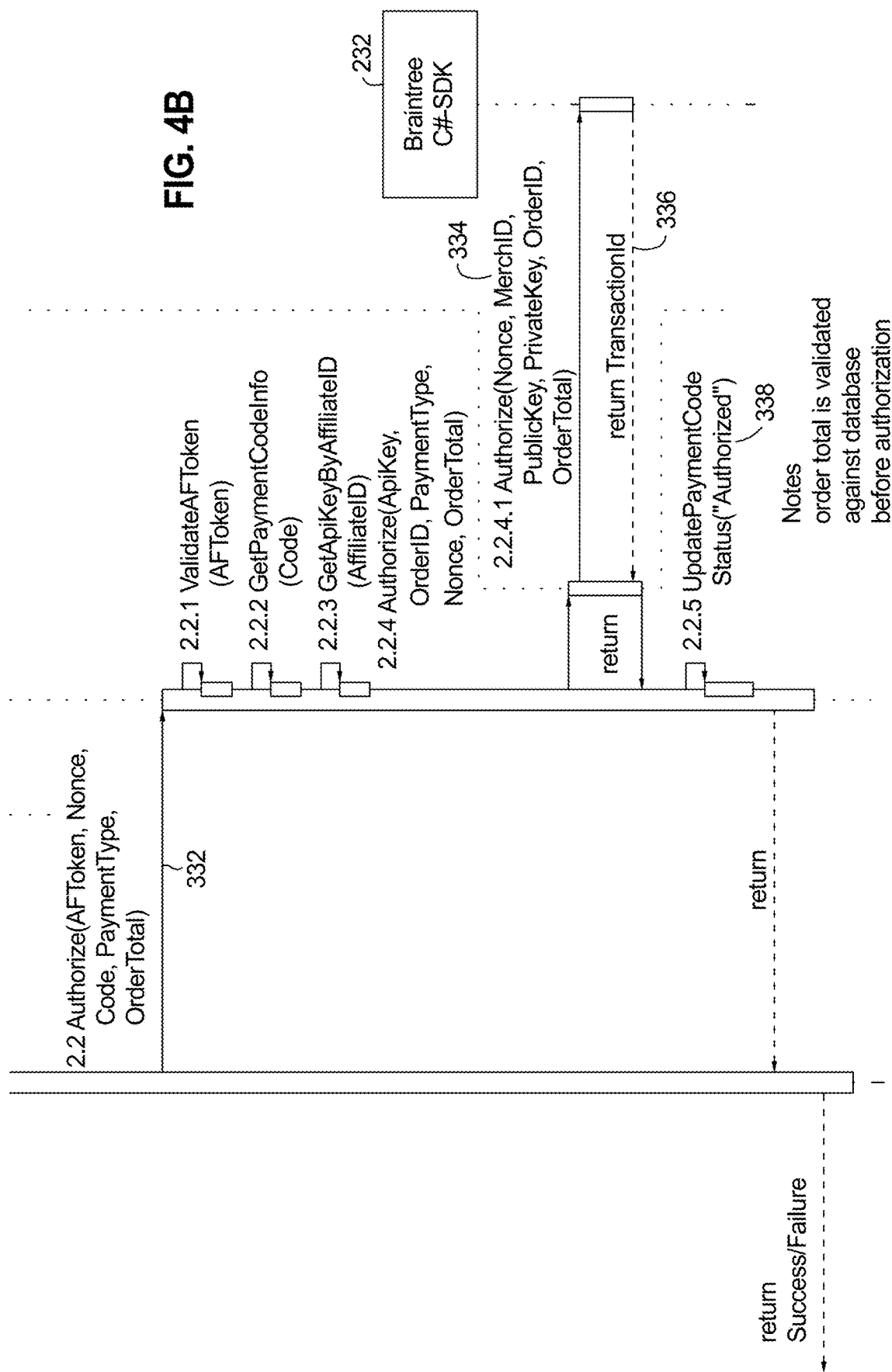

SYSTEM AND METHOD FOR ORDERING AND FACILITATING PAYMENT OF A PRINT PRODUCT INCLUDING A DIGITAL IMAGE

CROSS-REFERENCE TO RELATED APPLICATIONS

This application is a continuation of U.S. patent application Ser. No. 17/516,117 filed Nov. 1, 2021, now U.S. Pat. No. 11,575,798, which is a continuation of U.S. patent application Ser. No. 16/909,363 filed Jun. 23, 2020, now U.S. Pat. No. 11,172,077, which is a continuation of U.S. patent application Ser. No. 16/246,698 filed Jan. 14, 2019, now U.S. Pat. No. 10,728,400, which claims the benefit of U.S. patent application Ser. No. 62/675,111 filed May 22, 2018, the contents of which are all hereby incorporated by reference in their entirety.

FIELD OF THE INVENTION

The present invention is directed to a system and method for ordering and facilitating payment of a print product including a digital image; in particular, the present invention is directed to allowing a user to order a print product using a print product ordering system that is controlled by a first business entity, wherein payment for the fulfillment of the print product is made through a payment processing system controlled by a second business entity that is accessed using a user computing device through a unique payment link generated by the print product ordering system and provided to the user computing device. Further, upon receiving a payment notification from the payment processing system, the print order is fulfilled by a printing device and a request for a final payment is made by the print product ordering system to the payment processing system.

BACKGROUND OF THE INVENTION

The use of mobile computing devices to capture digital images has become commonplace. Digital images are being captured to record special family moments, to post the occurrence of events on social media websites, and to generate a wide variety of print products that incorporate the digital images. As the demand for print products has increased, a number of different computer-based platforms, such as photo kiosks, websites, and mobile applications, have been created to make it convenient for a consumer to order a print product. These platforms facilitate the process of obtaining a print product by allowing the consumer to upload a digital image from a user computing device, and select a physical print product for fulfillment.

Photo kiosks are an interactive computer-based platform that may be physically located within retail stores, drug stores and grocery stores. They are a convenient platform because they offer the customer the ability to upload digital images located in the user's mobile computing device or access digital images that were previously uploaded by the customer, and customize a print product using the uploaded digital images without having to interact with store personnel. This allows the user to take the necessary time to select a print product without being pressured. Further, depending on the capabilities of the kiosk and the print product ordered by the consumer, the kiosk may include a printing device that allows for the fulfillment of the print product on the spot. For example, a kiosk may be capable of instantly printing various sized image prints while the consumer waits providing instant satisfaction to the consumer.

While photo kiosks provide many advantages to the consumer, this platform does provide some drawbacks. For instance, in order for the customer to make payment for the print order, the photo kiosk may have a payment processing system incorporated therein that is configured to receive the user's personal identifiable information and payment information, and directly collect payment for the print order. This is not ideal because the inclusion of the payment processing system within the photo kiosk increases the cost of manufacturing the photo kiosk. Further, this method requires that the business entity that operates the kiosk to collect personal identifiable information and payment information from the user, which must be handled carefully by the business entity that operates the photo kiosk to avoid violating any applicable privacy regulations. There are scenarios where an order is placed at a photo kiosk and the customer must provide payment at a service counter to provide payment to a service representative. However, this alternative method defeats the purpose of the photo kiosk being a full functioning self-service platform that allows the customer to fulfill a print order without having to interact with a customer service representative.

Accordingly there is a need for a system and method for ordering and fulfilling a print order without requiring the photo kiosk to process payment for the print order, while at the same time eliminating the need for the customer to provide payment to a customer service representative. The present invention fills these needs as well as other needs.

SUMMARY OF THE INVENTION

In one aspect, the present invention includes a computer-implemented method programmed for execution in a computing environment for ordering and facilitating payment of at least one print product. The method is implemented utilizing a computing system including a processor, a memory, and a user interface in communication with the processor, wherein the computing system is controlled by a first business entity. The method comprises: a) storing a digital image in the memory of the computing system; b) allowing for the selection of at least one print product using the user interface accessed by a user computing device to establish a print order, wherein the at least one print product includes the digital image disposed thereon, and wherein the print order includes an identification of the selected at least one print product and an order cost to fulfill the print order; c) generating a unique payment link by the processor that corresponds to the print order, wherein the unique payment link provides the user computing device with access to communicate payment information to a remote payment processing system over a network to provide payment for the print order, wherein the payment processing system is controlled by a second business entity, and wherein the payment information includes personal identifiable information; d) providing access to the unique payment link to the user computing device; e) receiving a payment notification at the processor from the remote payment processing system; and f) allowing for the fulfillment of at least a portion of the print order using a printing device.

In another aspect, a computing system for ordering and facilitating payment of at least one print product is provided, wherein the computing system is controlled by a first business entity. The computing system comprises a processor, a memory, and a user interface in communication with the processor. The computing system is configured for: a) storing a digital image in the memory; b) allowing for the selection of at least one print product using the user interface accessed by a user computing device to establish a print order, wherein the at least one print product includes the digital image disposed thereon, and wherein the print order includes an identification of the selected at least one print product and an order cost to fulfill the print order; c) generating a unique payment link by the processor that corresponds to the print order, wherein the unique payment link provides the user computing device with access to communicate payment information to a remote payment processing system over a network to provide payment for the print order, wherein the payment processing system is controlled by a second business entity, and wherein the payment information includes personal identifiable information; d) providing access to the unique payment link to the user computing device; e) receiving a payment notification at the processor from the remote payment processing system; and f) allowing for the fulfillment of at least a portion of the print order using a printing device.

In yet another aspect, the present invention provides a non-transitory computer readable medium having thereon computer executable instructions for executing a method in a computing environment for ordering and facilitating payment of at least one print product. The method is implemented utilizing a processor and a memory, wherein the computing system is controlled by a first business entity. The method comprises: a) storing a digital image in the memory of the computing system; b) allowing for the selection of at least one print product using the user interface accessed by a user computing device to establish a print order, wherein the at least one print product includes the digital image disposed thereon, and wherein the print order includes an identification of the selected at least one print product and an order cost to fulfill the print order; c) generating a unique payment link by the processor that corresponds to the print order, wherein the unique payment link provides the user computing device with access to communicate payment information to a remote payment processing system over the network to provide payment for the print order, wherein the payment processing system is controlled by a second business entity, and wherein the payment information includes personal identifiable information; d) providing access to the unique payment link to the user computing device; e) receiving a payment notification at the processor from the remote payment processing system; and f) allowing for the fulfillment of at least a portion of the print order using a printing device.

In another aspect, a computer-implemented method programmed for execution in a computing environment for ordering and facilitating payment of at least one print product is provided. The method is implemented utilizing a computing system including a processor and a memory, wherein the computing system is controlled by a first business entity. The method comprises: a) storing a digital image in the memory of the computing system; b) allowing for the selection of at least one print product using a user computing device in communication with the processor to establish a print order, wherein the at least one print product includes the digital image disposed thereon, and wherein the print order includes an identification of the selected at least one print product and an order cost to fulfill the print order; c) generating a unique payment link by the processor that corresponds to the print order, wherein the unique payment link provides the user computing device with access to communicate payment information to a remote payment processing system over a network to provide payment for the print order, wherein the payment processing system is controlled by a second business entity, and wherein the payment information includes personal identifiable information; d) providing access to the unique payment link to the user computing device; e) receiving a payment notification at the processor from the remote payment processing system; and f) allowing for the fulfillment of at least a portion of the print order using a printing device.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawing, wherein:

FIGS. 4 and 4A-4C is a sequence diagram showing an example of how payment for a print order may be processed in conjunction with the method set forth in FIG. 3;

DETAILED DESCRIPTION OF THE INVENTION

Generally, the systems and methods described herein for ordering and facilitating payment of a print product including a digital image may be implemented in hardware, software or a combination thereof, and may be distributed across a variety of computing devices.

This document is organized as follows. In the first section, an overview of the techniques and implementation is provided and described with reference to some component devices and an embodiment of the invention. In the next sections, an exemplary system and algorithms for providing aspects of the present invention are discussed. Following this, an exemplary computer environment for the implementation and use of the invention is described.

Figure 1:
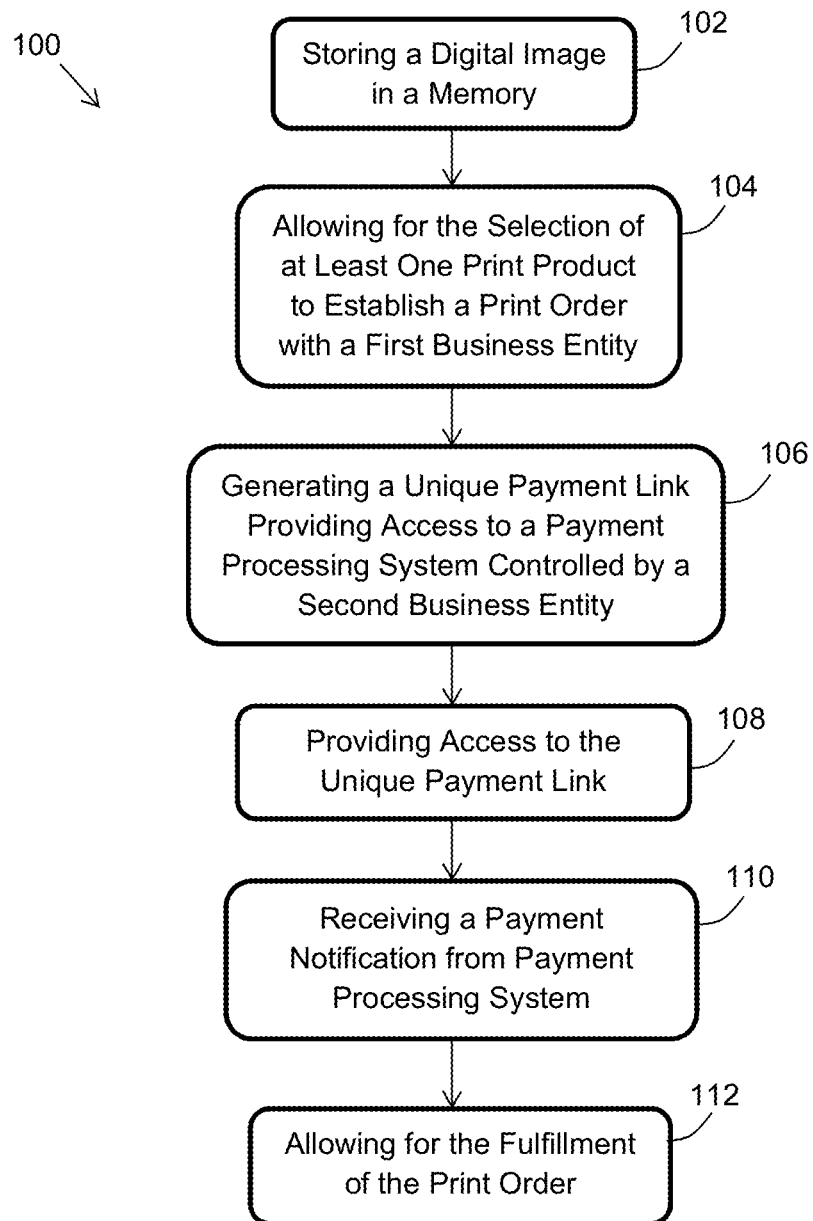
FIG. 1 is a flow chart illustrating an exemplary method for implementing one or more aspects of the present invention.

In general, the present invention provides a computer-implemented method in the form of computer-executable instructions programmed for allowing a consumer (hereinafter "user") to order a print product including a digital image from a first business entity, and facilitating payment of a print order through a payment processing system controlled by a second business entity using the user's computing device. Referring to the drawings, FIG. 1 illustrates a flow of an exemplary method 100 in accordance with one aspect of the present invention. Initially, method 100 includes a step 102 of storing a digital image provided by a user in a memory that may be accessed by the first business entity so that the print product can be subsequently fulfilled using the digital image. Next, the user is allowed to select at least one print product to establish a print order at step 104. The print product may be any type of product that is capable of incorporating the digital image thereon, including, but not limited to, an image print, calendar, mug, photo book, posters, blankets, phone case, pillows, clothing, or jewelry. The print order that is established may include an identification of the selected at least one print product and an order cost to fulfill the print order. After the print order is established, a unique payment link is generated by the first business entity to correspond to the print order at step 106. The unique payment link provides a user computing device with access to communicate with the remote payment processing system over a network to provide payment for the print order. At step 108, access to the unique payment link is provided to the user computing device. Next, at step 110, the first business entity receives a payment notification from the remote payment processing system indicating that a payment authorization has been received by the remote payment processing system through use of the unique payment link by the user computing device, wherein the payment authorization is for an amount equal to the order cost. After receiving the payment authorization, the method then allows for the fulfillment of at least a portion of the print order using a printing device at step 112. Other aspects of the method are described in more detail below.

Figure 2:
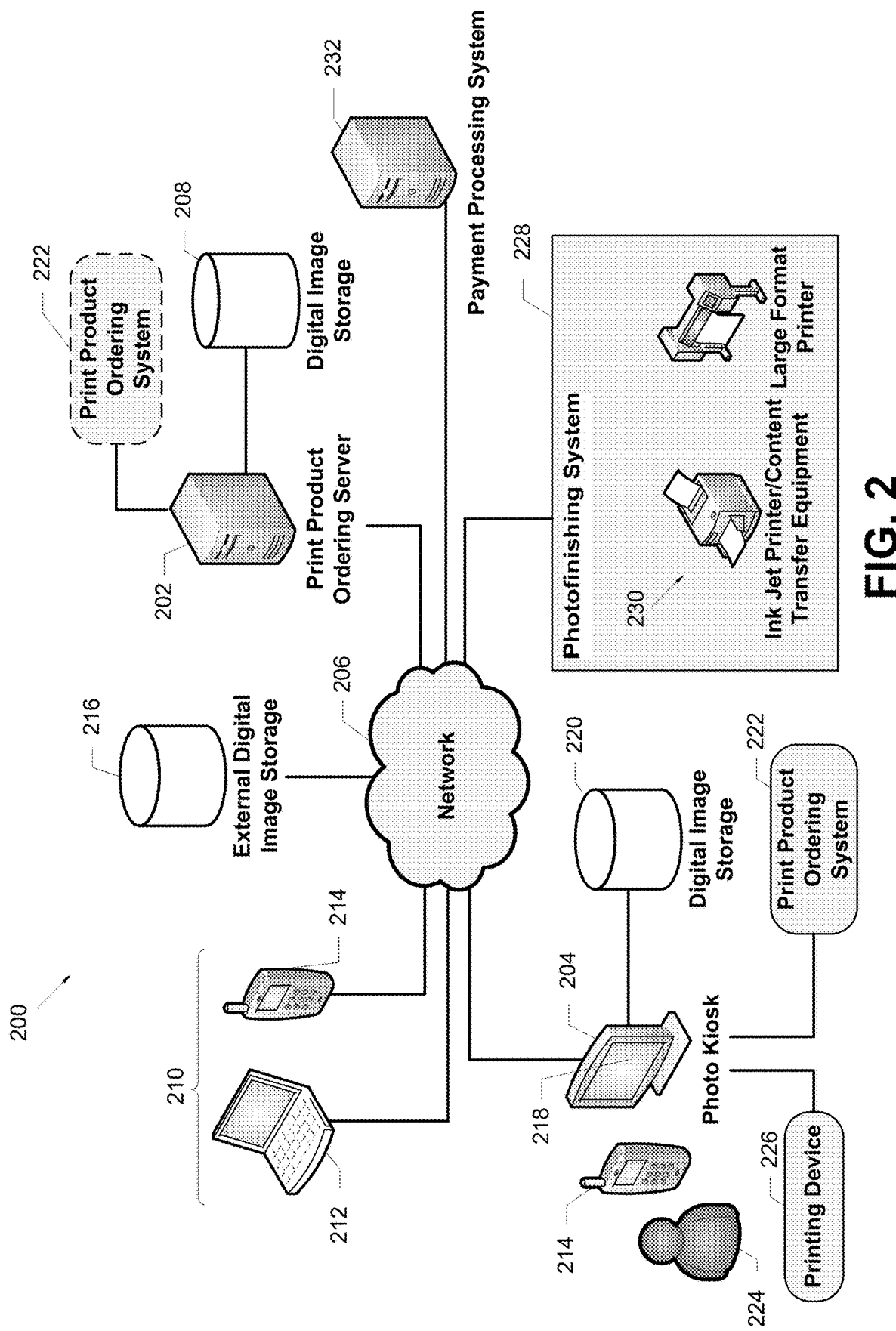
FIG. 2 is a block diagram generally illustrating various components that may be utilized for the implementation of one or more aspects of the present invention.

Referring now to FIG. 2, an exemplary system that may be used to implement the methods and aspects described herein is identified as reference number 200. System 200 may comprise a print product ordering server 202 and a photo kiosk 204 (hereinafter "kiosk") that are in communication over a network 206 and controlled and/or operated by a first business entity. Network 206 may be any type of network, such as a wide area network or local area network through a wired or wireless connection. In one aspect as described below, server 202 and kiosk 204 operate in conjunction with one another to accomplish the functionality provided by the methods described herein. However, it should be understood that it is also within the scope of the present invention to have kiosk 204 perform one or more operations that are provided by server 202.

Server 202 includes a memory 208 that is configured for storing one or more digital images that are transferred from a customer computing device 210 (hereinafter "user computing device") over network 206. User computing device 210 may be any type of computing device, such as, but not limited to, a desktop computer 212 or a mobile computing device 214 (e.g., smartphone, tablet, etc.) that is capable of transferring one or more digital images to server 202 over network 206. For example, the transfer of the digital images to server 202 may be directly from a memory of user computing device 210. The transfer of digital images to server 202 may also be from an external storage location 216, such as a social media website (e.g., INSTAGRAM® and PHOTO®) or cloud-based memory location when such a transfer is authorized by the user or otherwise permitted using the user computing device 210. Server 202 further includes a processor that is configured for executing the computer executable instructions that are provided to perform the operations and functions described in detail below.

Kiosk 204 is an interactive computer-based platform comprising a user interface 218 (e.g., display monitor with touch screen capabilities) and a memory 220 that is used alone or in combination with server 202 to implement a print product ordering system 218. Print product ordering system 218 is configured to associate at least one digital image (hereinafter "digital image") with a digital representation of an available print product substrate to form a digital representation of the resulting print product for display on user interface 218 of kiosk 204 for selection by a user 224. The association of the digital image and the digital representations of the substrates provides user 224 with a visual representation of how the digital image will look on a substrate if it were ordered and fulfilled. Print product ordering system 218 may also operate to allow for an association of a digital image with an available substrate without displaying a visual representation of the resulting print product. The digital image used by print product ordering system 218 may be obtained from memory 208 of server 202, or uploaded to memory 220 of kiosk 204 using an external memory device, such as a thumb drive or memory card, or through communication with mobile computing device 214 through a Bluetooth, LWAN (e.g., WiFi), or other similar connection. After the digital image is transferred to kiosk 204, the digital image may be stored locally in the memory of kiosk 204 and/or in memory 208 in server 202.

Print product ordering system 218 is further configured to allow user 224 to establish a print order including the selected substrate and the associated digital image to be disposed thereon. Once the print order is established, print product ordering system 218 proceeds to operate in accordance with certain aspects of the present invention to facilitate payment for the print order as will be described in more detail below. When it comes time to fulfill the print order by producing the print product including the digital image, system 200 may utilize a printing device 226 incorporated within kiosk 204, or communicate the print order to a photofinishing system 228 over network 206. The determination as to where fulfillment of the print order takes place may be determined based on the capabilities of printing device 226 and/or the supply of the printing substrates that are currently available to printing device 226. For example, if the print order specifies a substrate that is not capable of being generated by printing device (e.g., a coffee mug), then kiosk 204 may communicate the print order to photofinishing system 228, which may have a plurality of different printing devices 230 that are capable of printing on a variety of substrates. In another example, even though kiosk 204 is capable of printing on the substrate specified in the print order, the print order may be communicated to photofinisher 228 for fulfillment if kiosk 204 currently does not have a sufficient amount of substrate to fulfill the print order. Print product ordering system 218 may also be configured to take into consideration the available substrate supplies and printing capabilities of kiosk 204 and/or photofinishing system 228 when displaying the substrates available for selection by user 224 on user interface 218. Therefore, if neither kiosk 204 nor photofinishing system 228 is able to produce a certain print product based on capability or supply of substrate, then user 224 will not be presented the option on user interface 218 to establish a print order including such a substrate.

It should be understood that print product ordering system 222 may be stored in memory 220 of kiosk 204 and/or in memory 208 of server 202. Print product ordering system 222 is not limited to any specific hardware or software configuration, but may rather be implemented as computer executable instructions in any computing or processing environment, including in digital electronic circuitry or in computer hardware, firmware, device driver, or software.

System 200 may further include the utilization of a payment processing system 232 (e.g., BRAINTREE) that is in communication with network 206, and controlled or operated by a second business entity. It should be understood that the second business entity is different than the first business entity that controls or operates server 202 and kiosk 204. As will be described in more detail below, print product ordering system 222 provides user computing device 210, and preferably mobile computing device 214, with access to payment processing system 232 by sending a unique payment link that may be used to complete payment for the print order with payment processing system 232. In this manner, user proceeds to use mobile computing device 214 to communicate the necessary information (e.g., credit card information) to pay for the print order directly to payment processing system 232 without any communication of such information to print product ordering system 222, server 202 or kiosk 204. Once payment authorization is obtained by payment processing system 232, notification of the authorization may be sent to print product ordering system 222, and the print order can be fulfilled by printing device 226 and/or 230.

Figure 3:
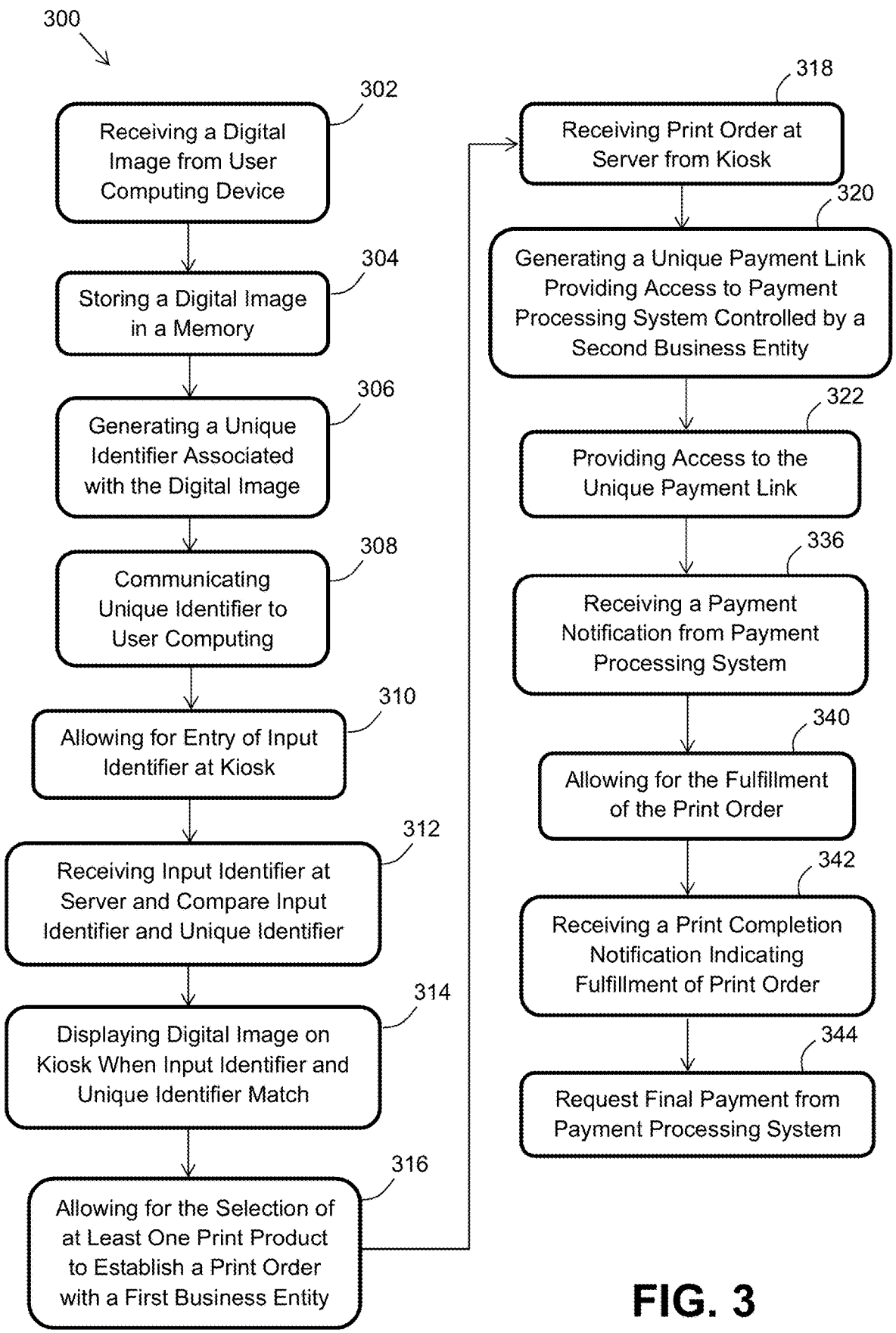
FIG. 3 is a flow chart illustrating another exemplary method for implementing one or more aspects of the present invention.
Figure 4A:
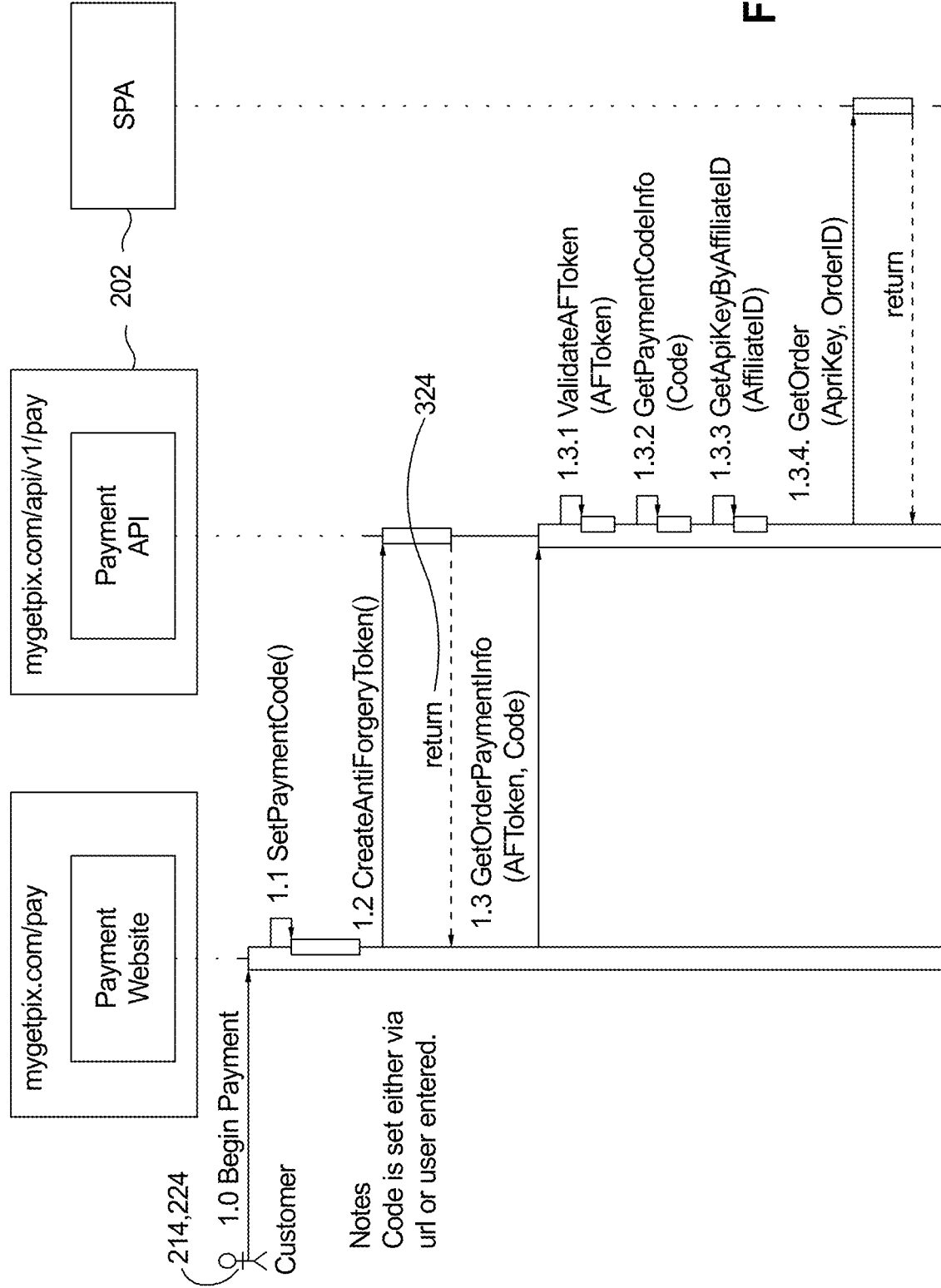
Figure 4C:
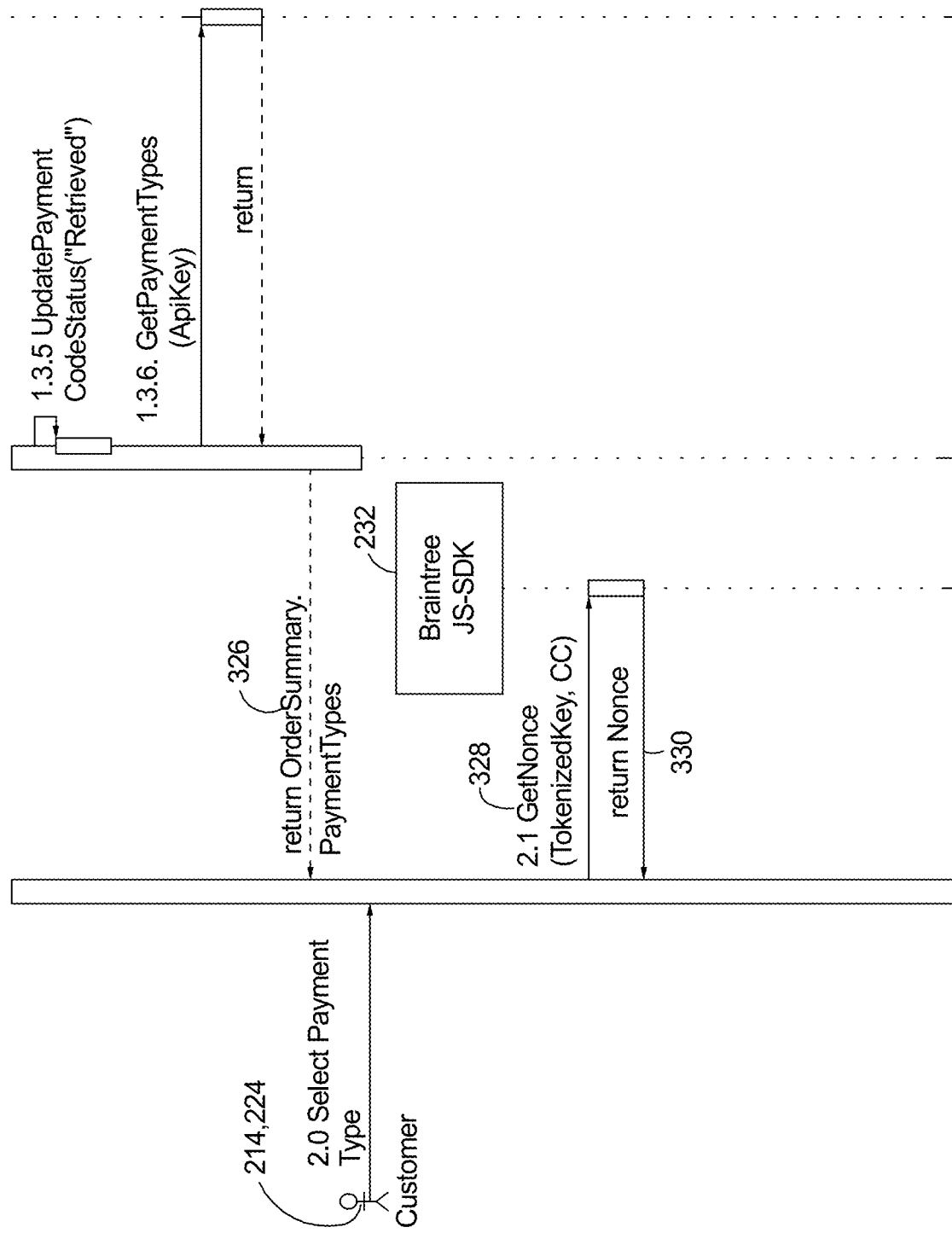

FIG. 3 is a flow diagram showing an exemplary method 300 that may be implemented using system 200 in accordance with one aspect of the present invention. FIGS. 4A-4J are exemplary screen shots from kiosk 204 that may be displayed on user interface 218 during the implementation of method, and FIGS. 5A-5M are exemplary screen shots from a display of user computing device 210 during implementation of method 300. The aforementioned screen shots will be referred to throughout the discussion set forth below to illustrate an exemplary implementation of method 300.

Method 300 is computer-implemented and programmed for execution in a computing environment for ordering and facilitating payment of at least one print product. Method 300 comprises a step 302 of receiving at least one digital image ("digital image") at server 202 from user computing device 210 over network 206. The digital image may be received directly from user computing device 210 or external storage location 216, or indirectly by mobile computing device 214 uploading the digital image using kiosk 204 and then to server 202. For example, as best seen in FIGS. 6A-6F, mobile computing device 214 may be used to accept the terms and conditions for using system 200, select or capture one or more digital images, and upload the digital images to server 202.

Figure 6A:
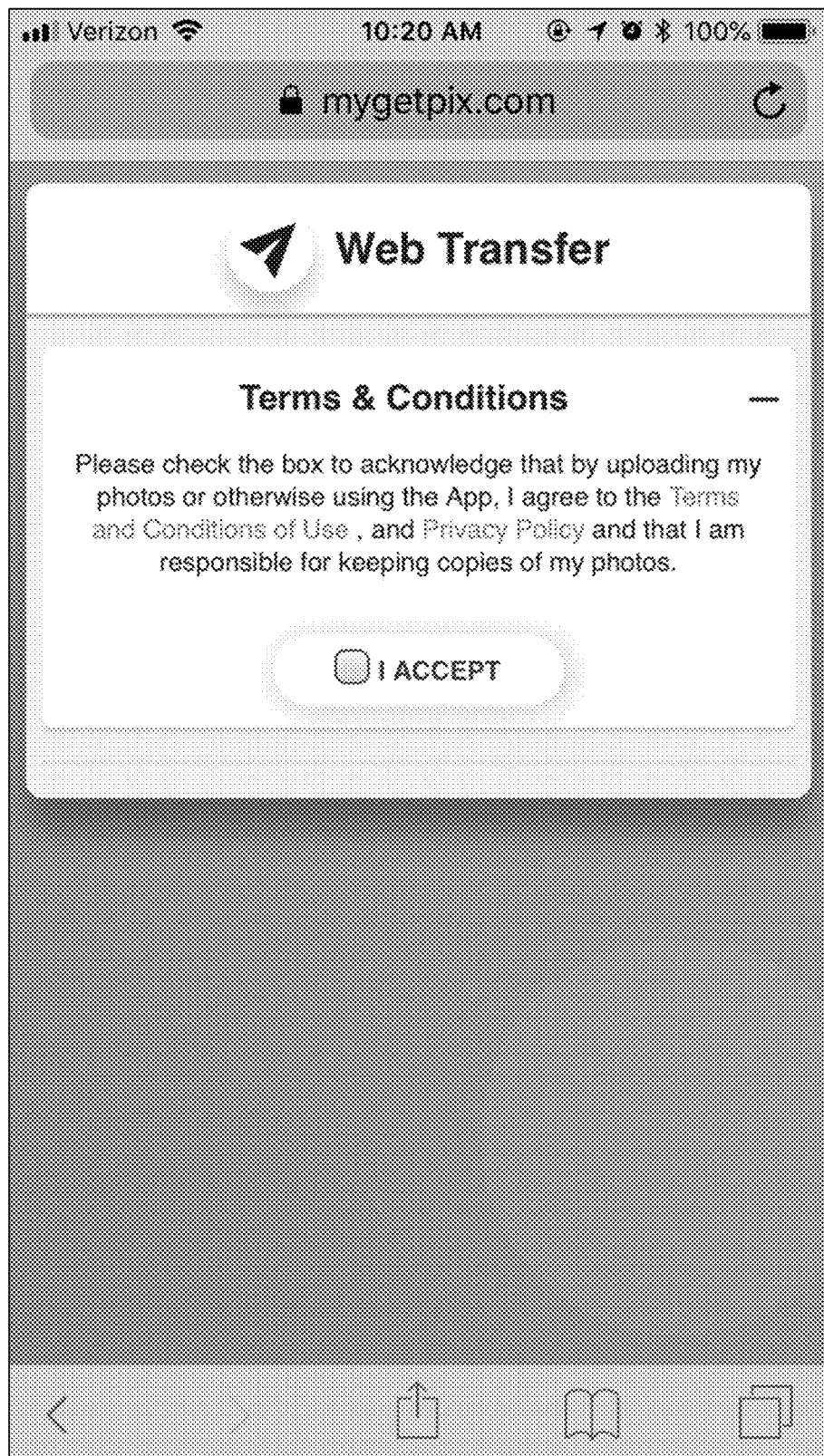
FIGS. 6A-6M are exemplary screen shots from a mobile computing device when used in accordance with the method set forth in FIG. 3.
Figure 6B:
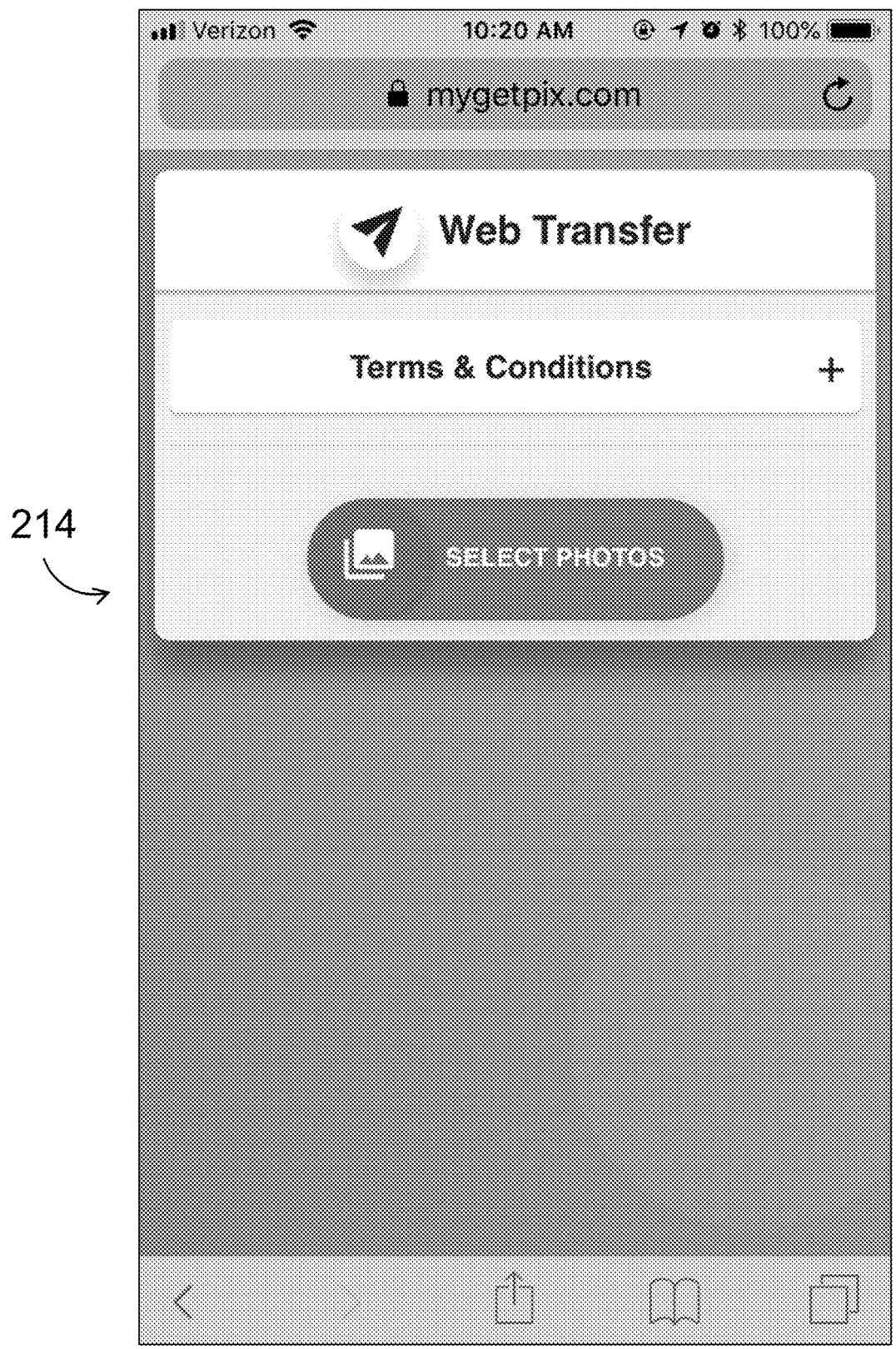
Figure 6C:
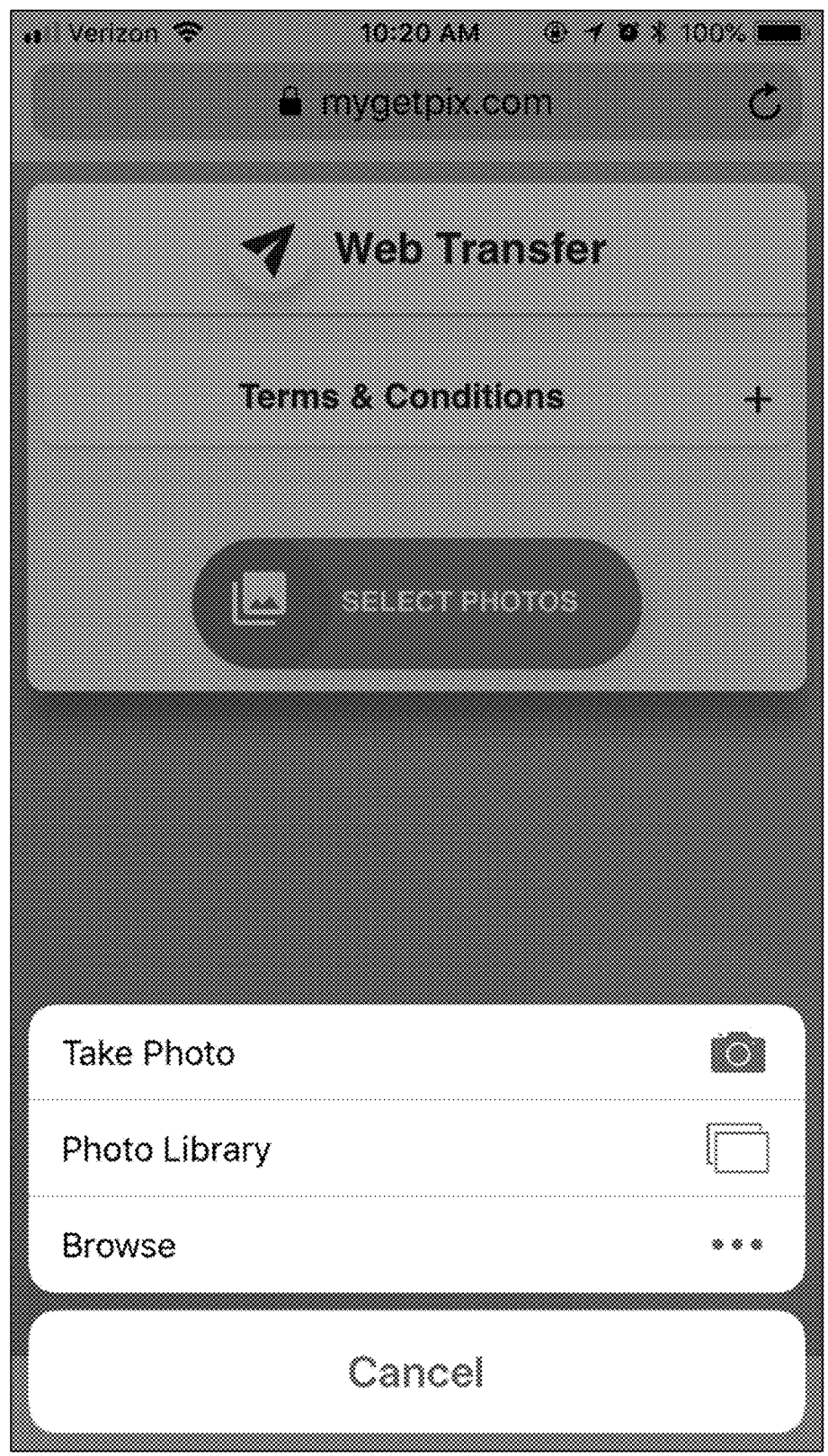
Figure 6D:
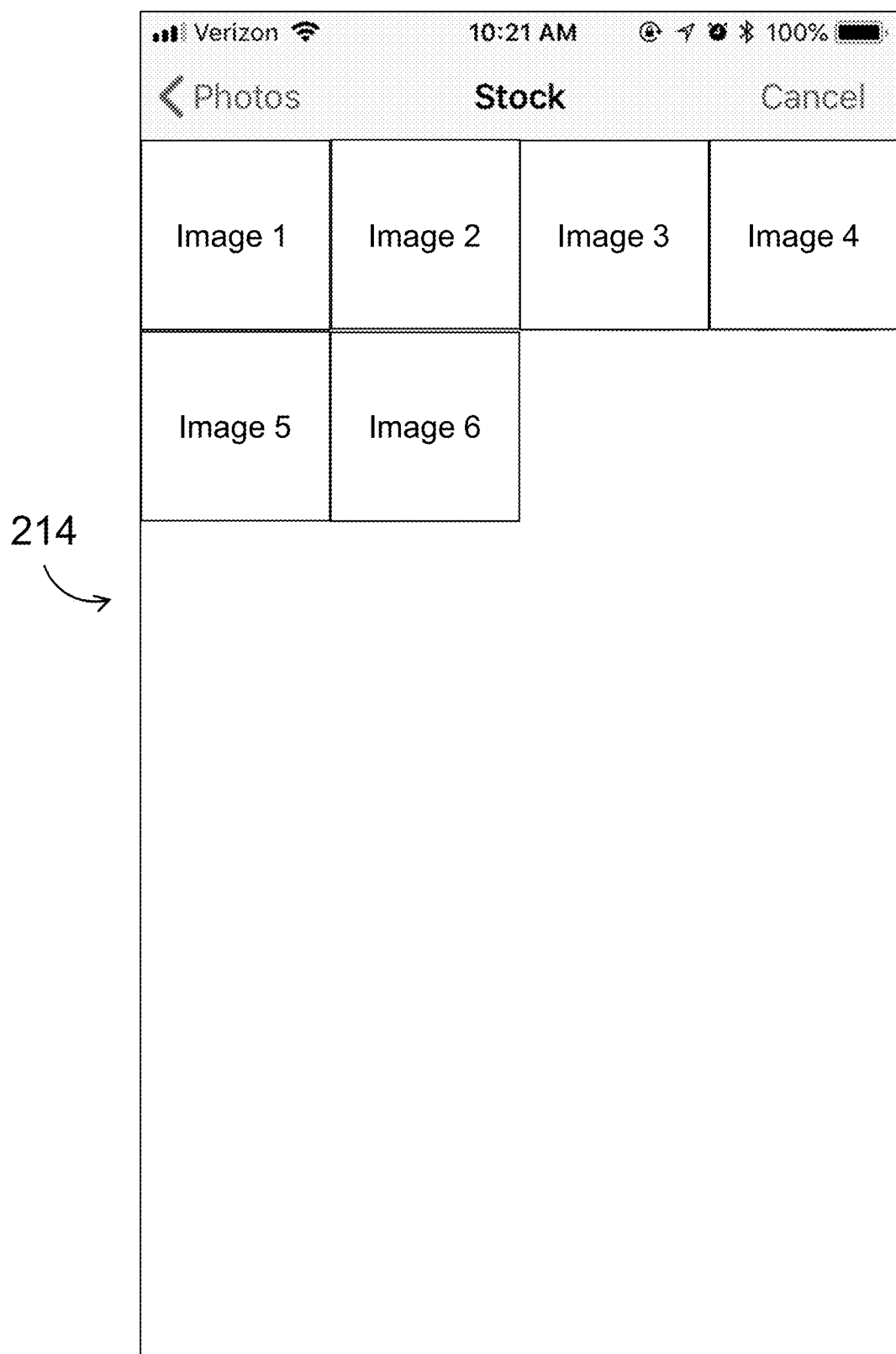
Figure 6E:
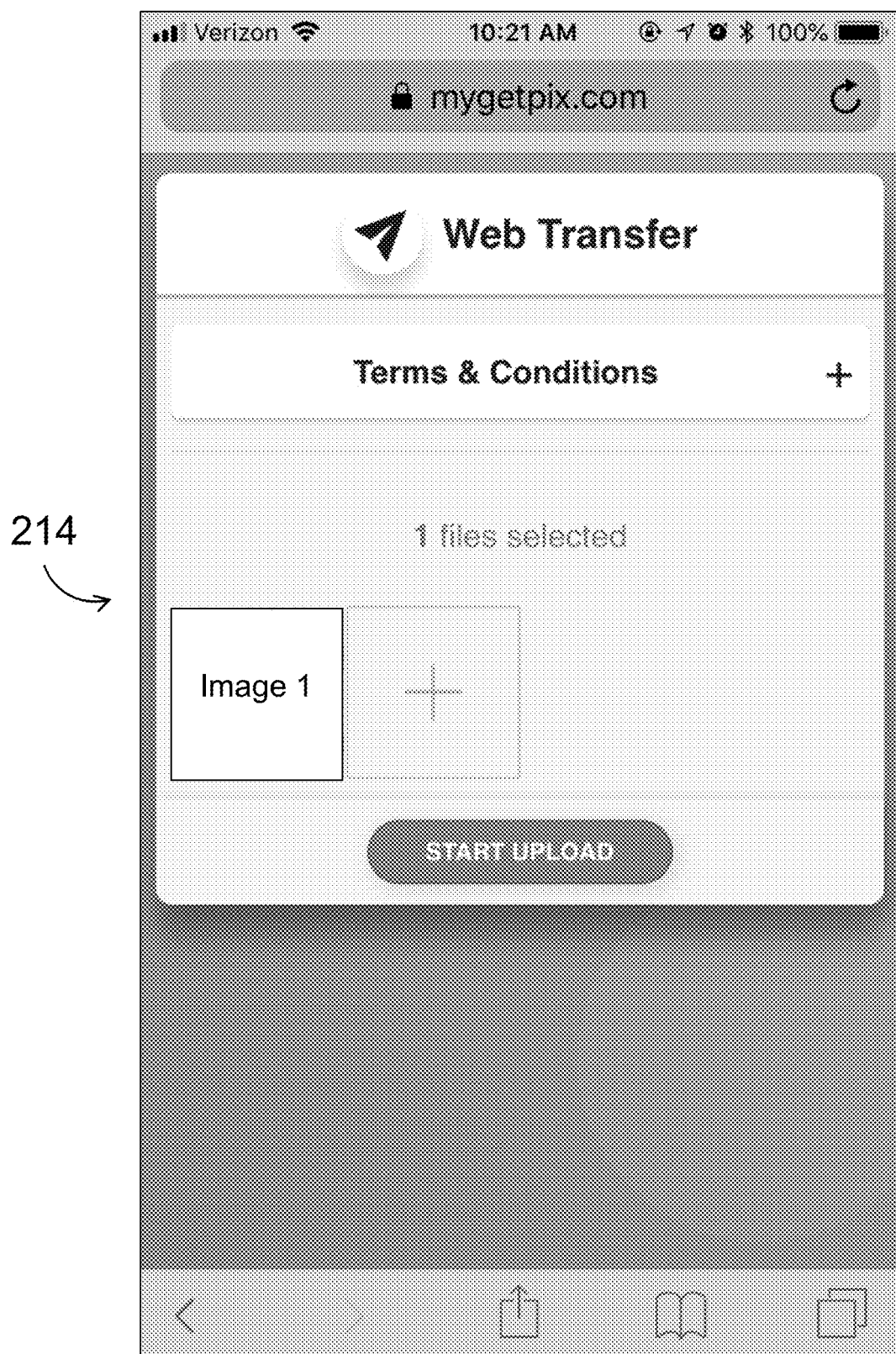
Figure 6F:
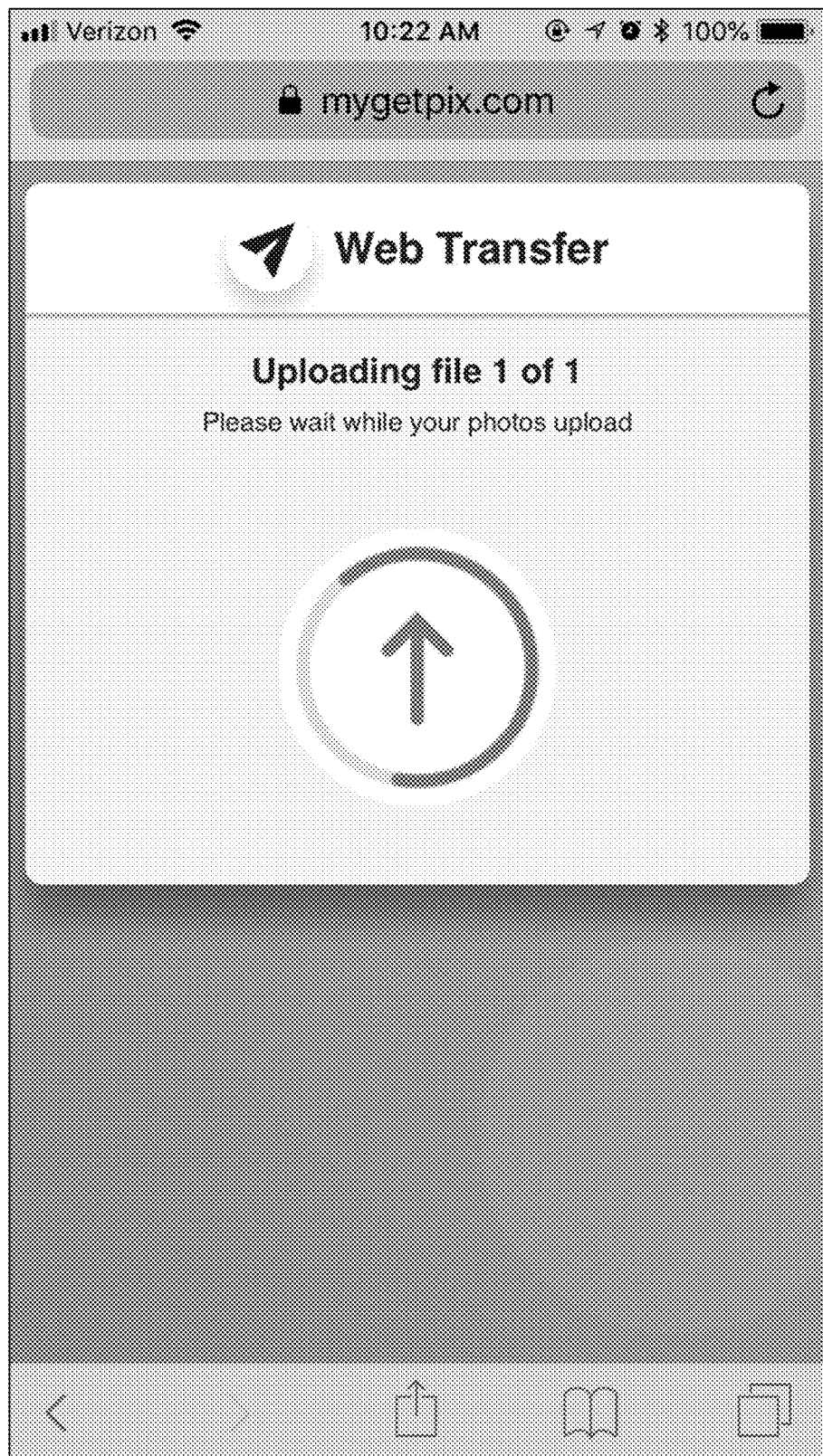
Figure 6G:
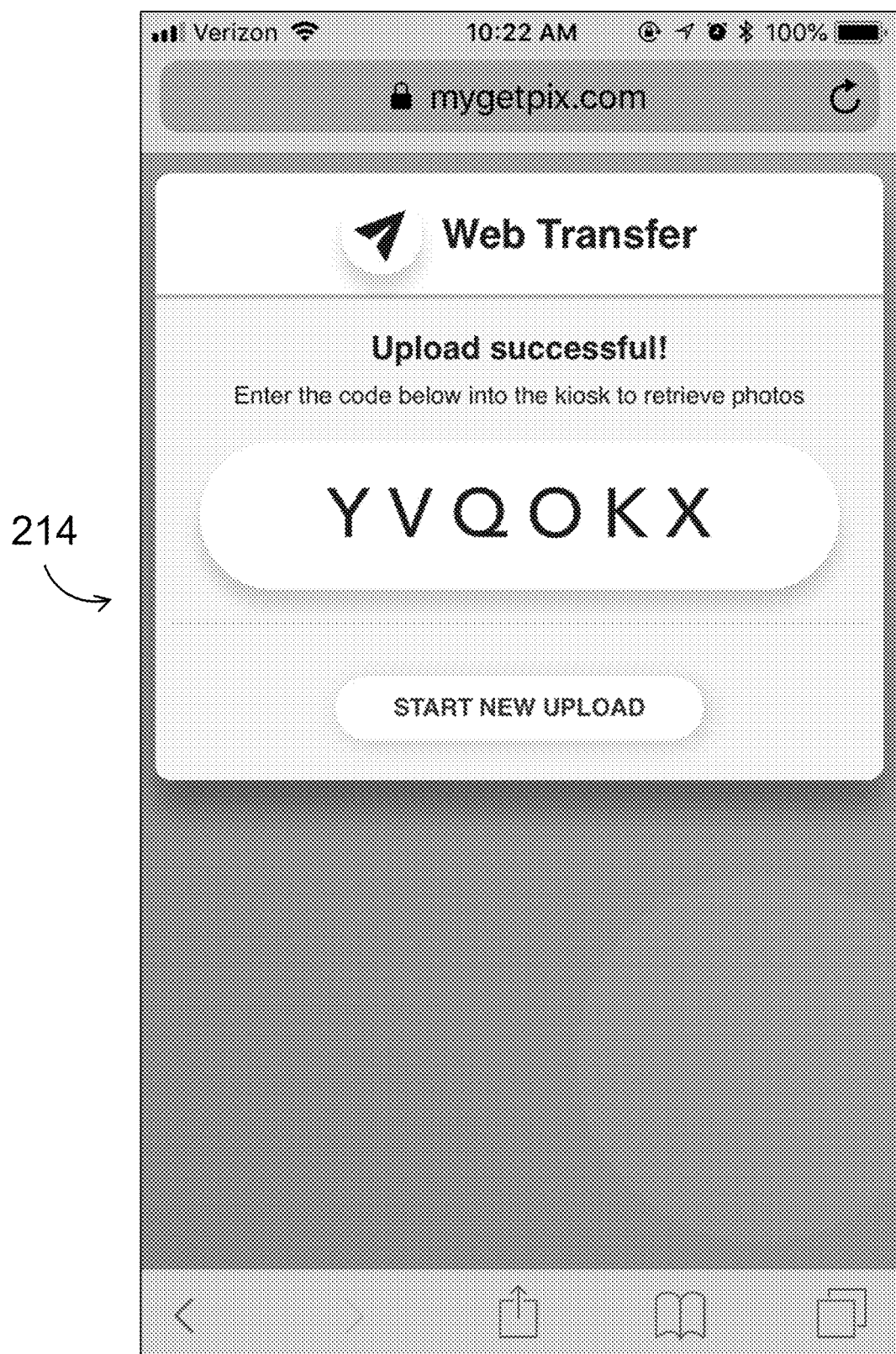

After server 202 receives the digital image, the digital image is stored in memory 208 of server 202 at step 304. When the digital image is stored in memory 208 of server 202, a unique identifier is generated by server 202 at step 306, wherein the unique identifier is associated with the digital image. In other words, the digital image may be tagged with the unique identifier so that the digital images can be later recalled from memory 208 using the unique identifier. The unique identifier may be a code including at least one of numbers, letters, or symbols. At step 308, as best seen in FIG. 6G, the unique identifier is then communicated to user computing device 210 that uploaded the digital images to server 202 so that the digital images can be recalled when utilizing kiosk 204 to order a print product including the digital image.

Figure 5A:
FIGS. 5A-5J are exemplary screen shots from a user interface of a kiosk when used in accordance with the method set forth in FIG. 3.
Figure 5B:
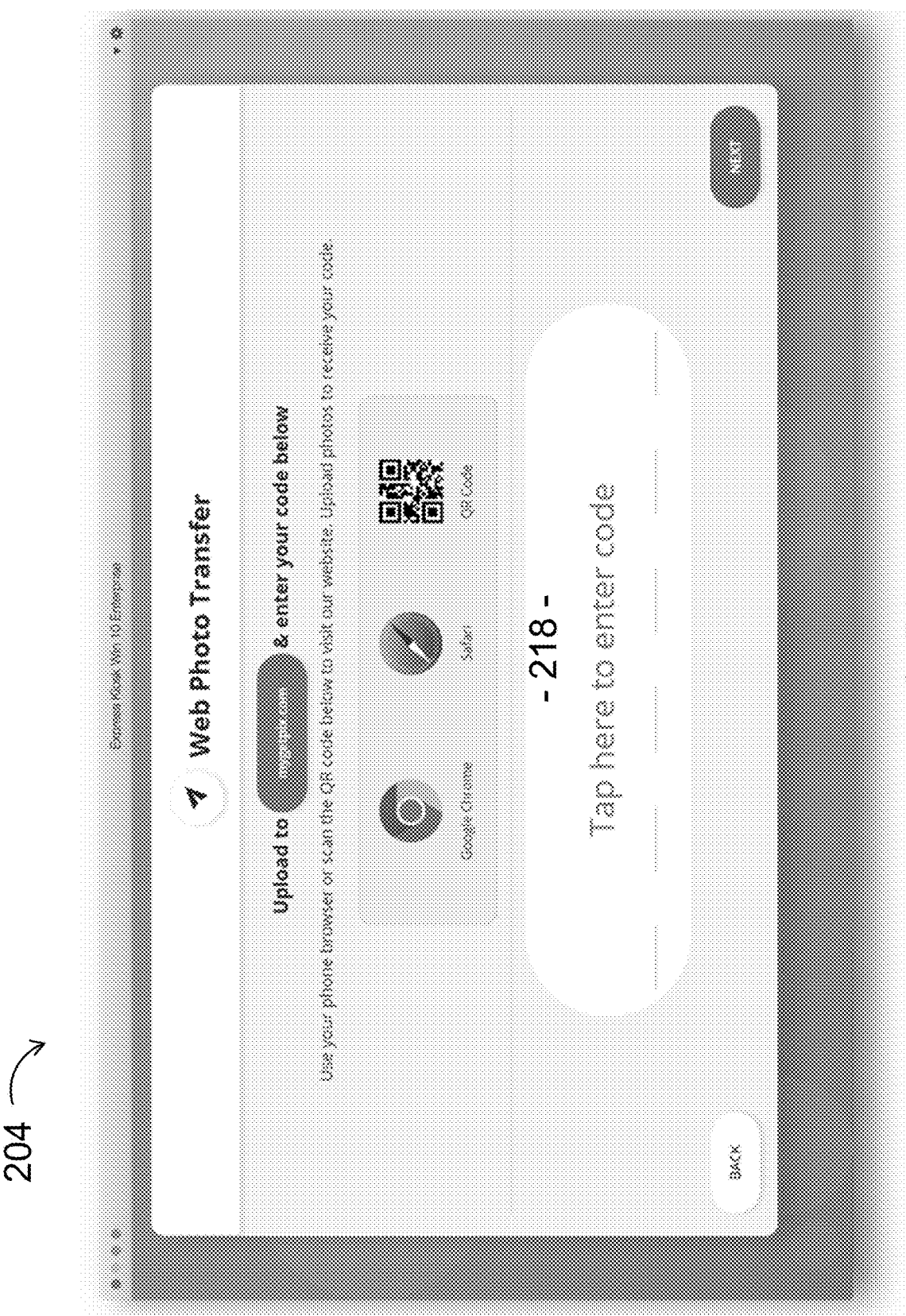
Figure 5C:
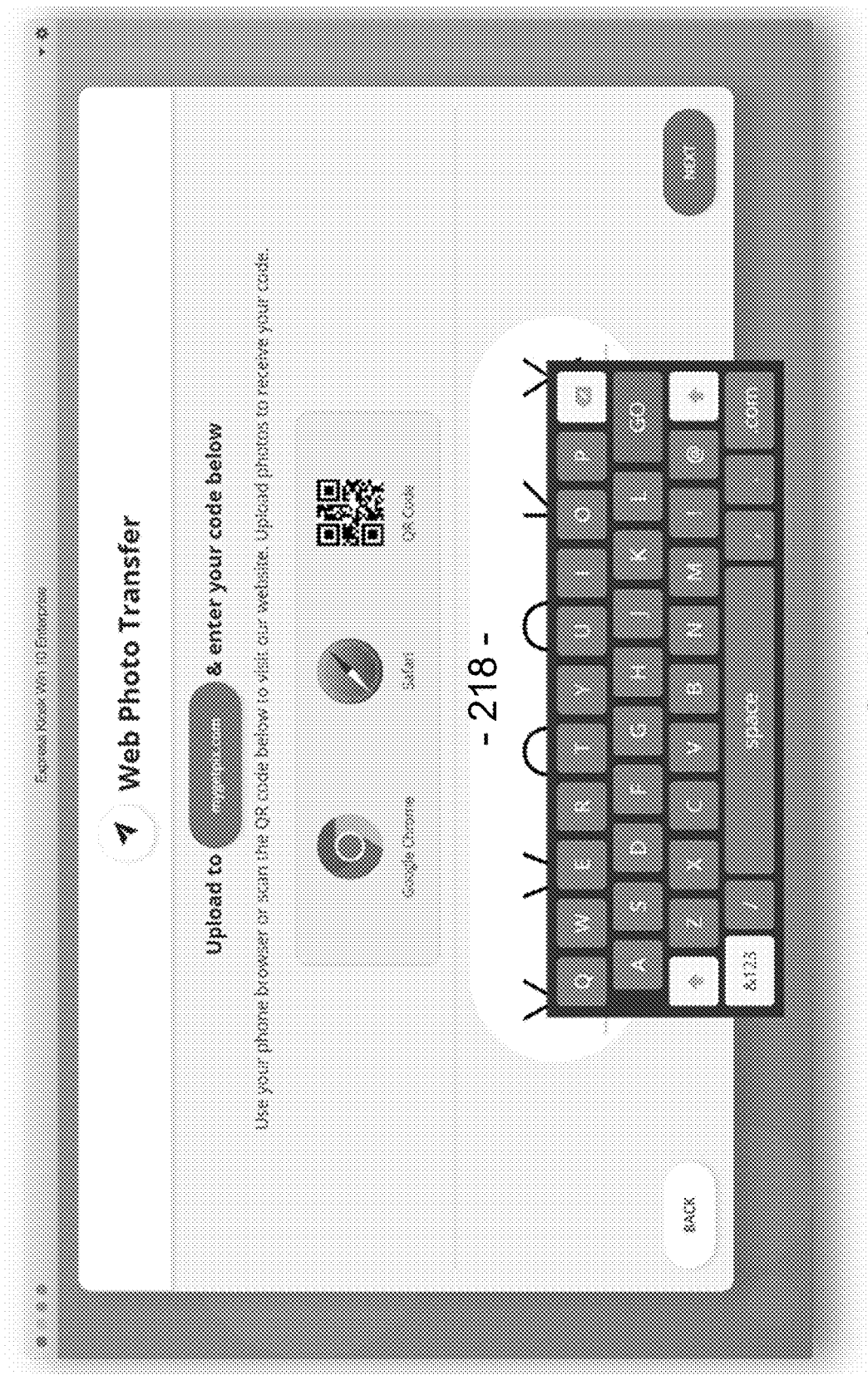
Figure 5D:
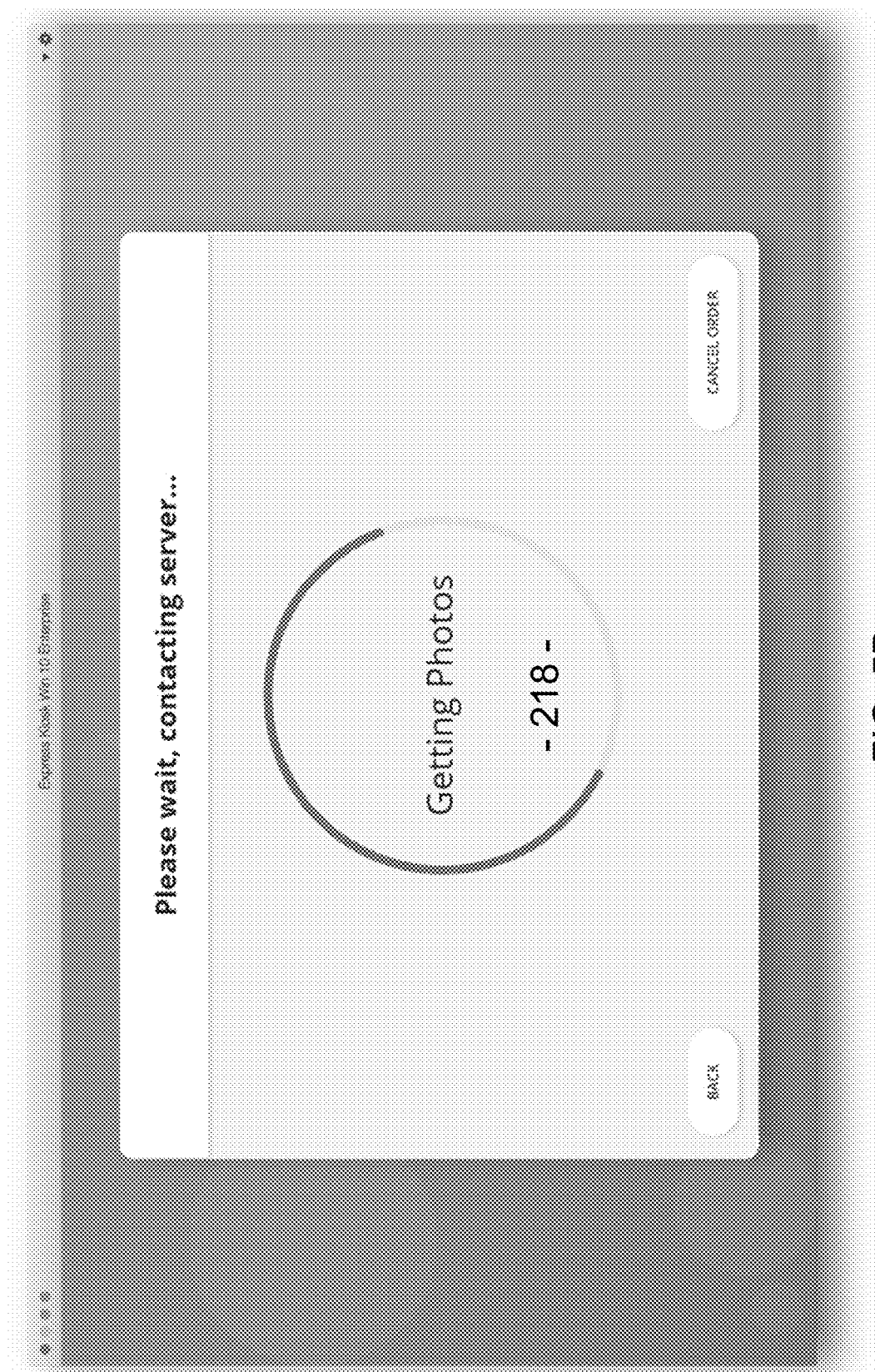
Figure 5E:
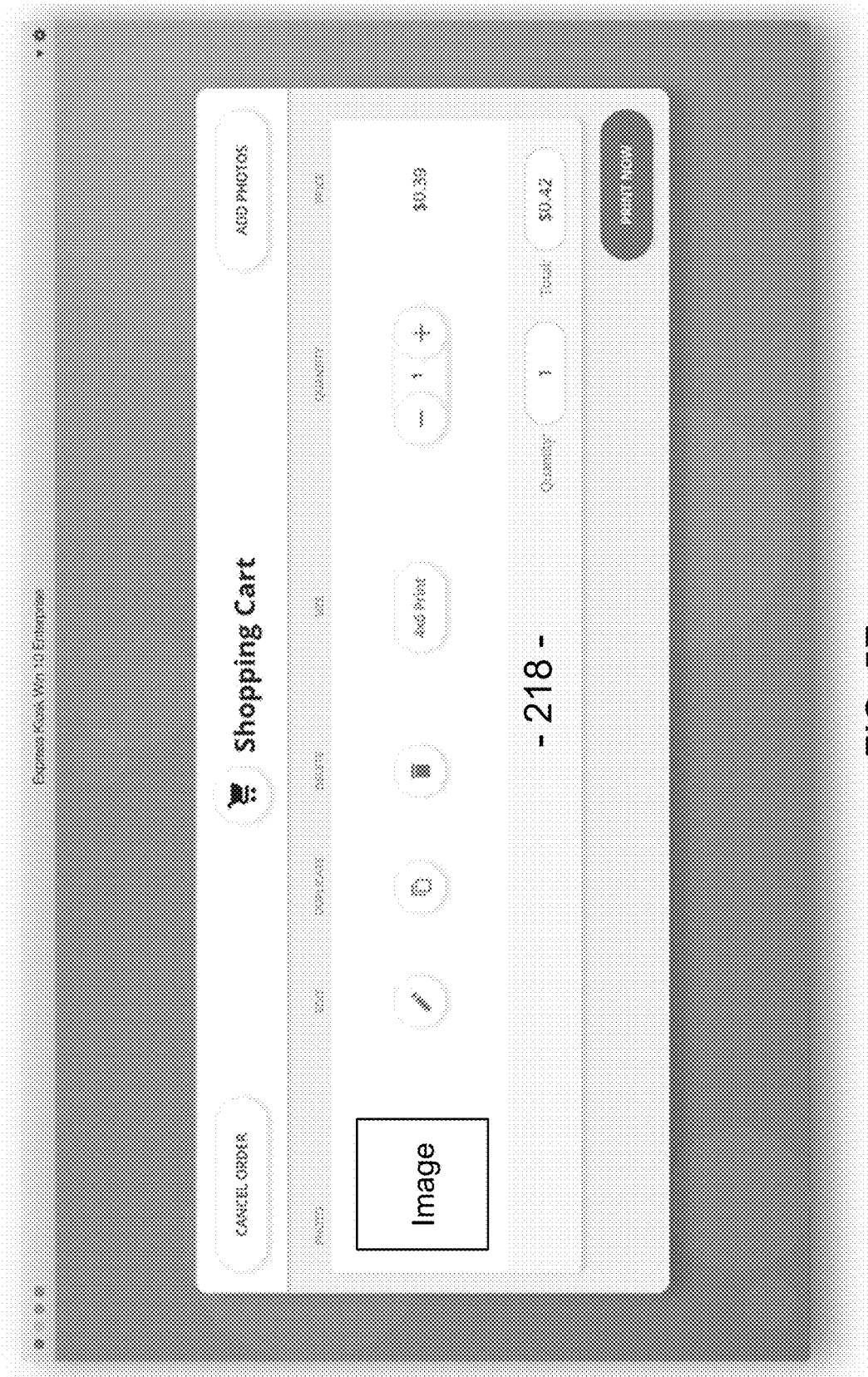
Figure 5F:
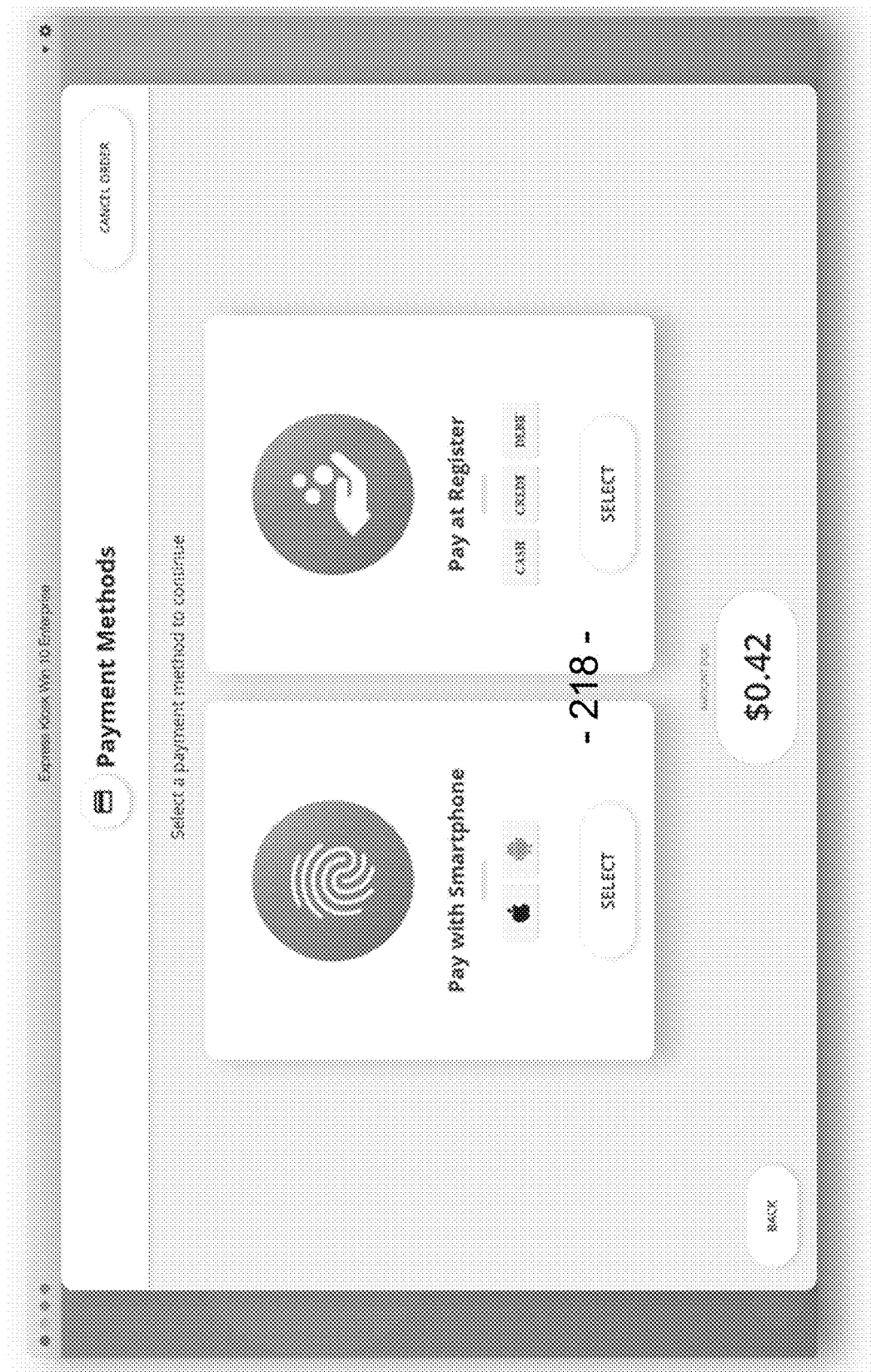

At step 310, as best seen in FIGS. 5A-5C, kiosk 204 allows for the input identifier to be provided either by manual entry by a user using user interface 218, or by an interaction between mobile computing device 214 and kiosk 204 such as by the scanning of a code displayed on mobile computing device 214 by kiosk 204. The input identifier is received at server 202 from kiosk 204, and the processor of server 202 compares the input identifier with the unique identifier at step 312, as seen in FIG. 5D. When the input identifier matches the unique identifier, the digital image stored in memory 208 of server 202 is communicated to kiosk 204 over network 206 for display on user interface 218 of kiosk 204 at step 314. Once the digital image is displayed on user interface 218, as seen in FIG. 5E, digital image may be edited or modified by changing the attributes or characteristics of the digital image such as, but not limited to, color, saturation, hue, contrast, brightness, as well as cropping, panning, enlarging, or rotating the digital image.

At step 316, method 300 allows for the selection of at least one print product ("print product") using user interface 218 of kiosk 204 to establish a print order. In some instances, the available section of print products may be limited to only those print products that are capable of being printed by kiosk 204, and photofinishing system 228 if utilized in system 200. The print order may include an order number, an identification and quantity of the selected print product, and an order cost to fulfill the print order. Order cost information may be stored and/or calculated at kiosk 204 and/or server 202. As seen in FIG. 5E, the print order may be submitted by clicking a "print now" button on user interface 218, which results in the print order being received at server 202 from kiosk 204 over network 206 at step 318. As seen on FIG. 5F, payment options are then displayed for selection by a user to give the user an option to pay using mobile computing device 214 or to pay at the register.

Figure 5G:
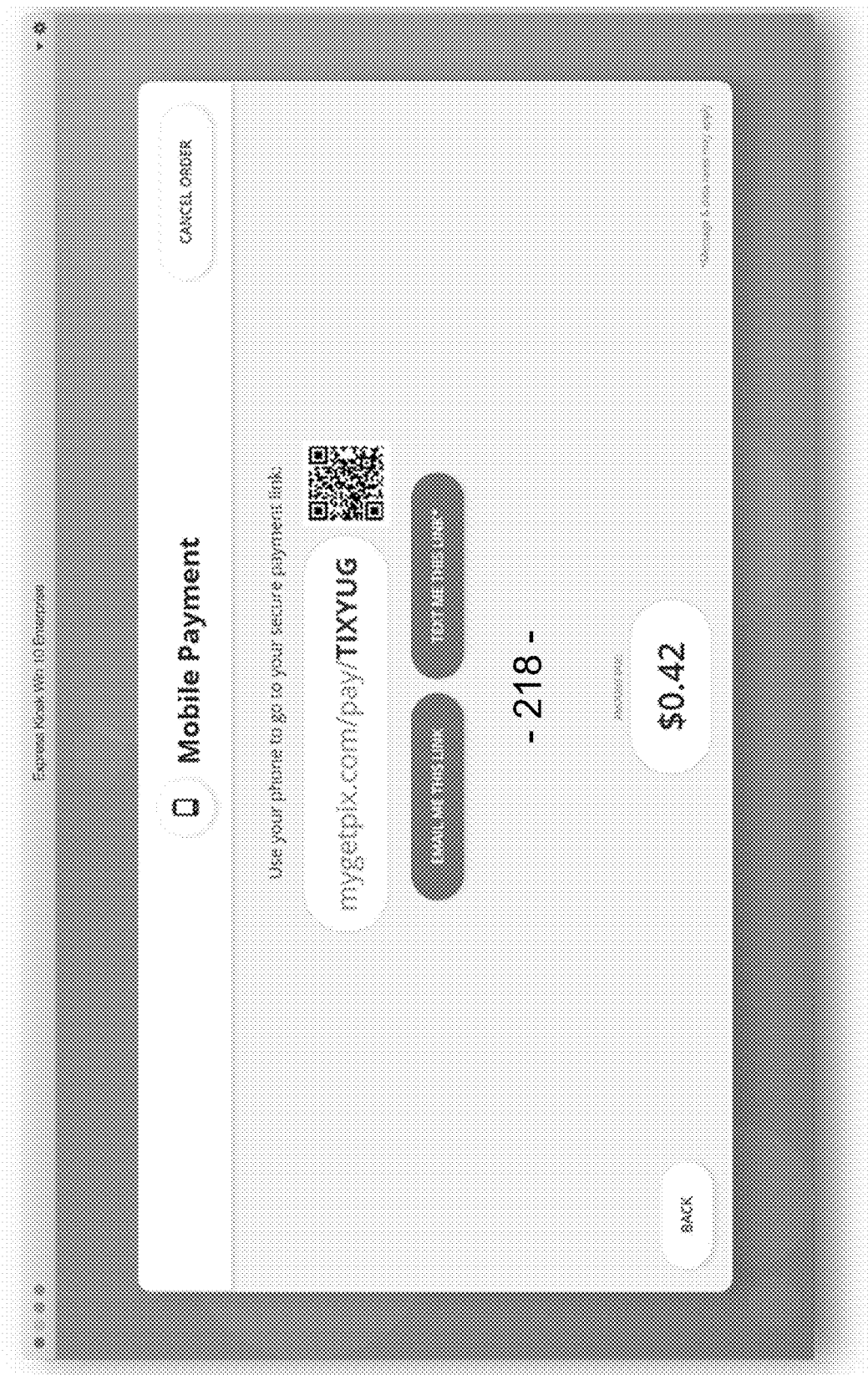
Figure 5H:
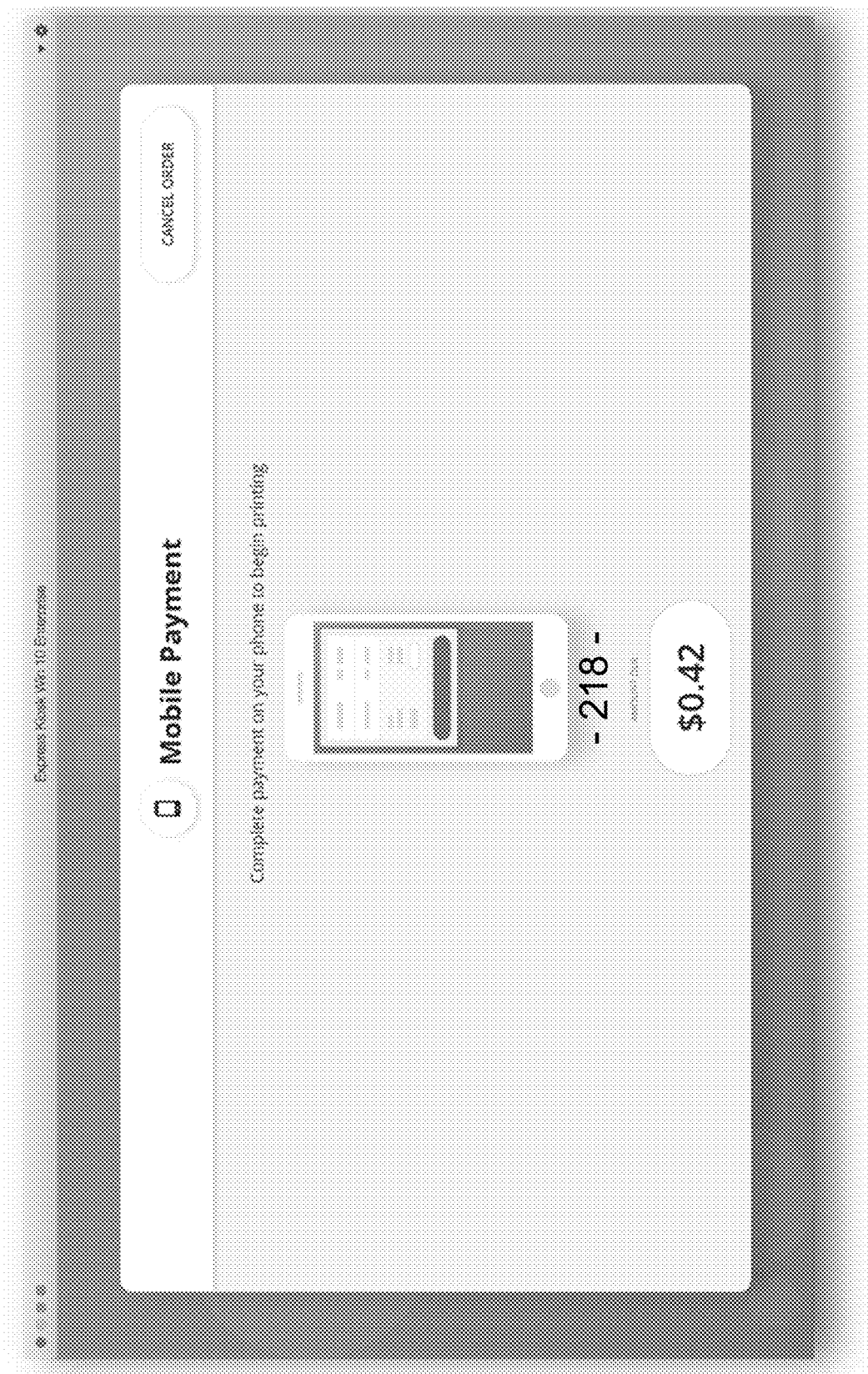

After receiving the print order from kiosk 204 and an indication that the print order is to be paid for using mobile computing device 214, a unique payment link or code is generated at server 202 or kiosk 204 that corresponds to the print order at step 320, and provides mobile computing device 214 with access to communicate with payment processing system 232 over network 206 to provide payment for the print order. As mentioned above, payment processing system 232 is controlled by a second business entity. For example, the unique payment link may be in the form of a Uniform Resource Locator (URL) link. At step 322, as seen in FIG. 5G, access to the unique payment link is provided to mobile computing device 214 to begin paying for the print order using payment processing system 232. Access to the unique payment link may be provided to mobile computing device 214 in any number of ways, including displaying the unique payment link on user interface 218 of kiosk 204 so that unique payment link may be manually entered into mobile computing device 214. Access may also be provided by displaying various buttons on user interface 218 that will operate to communicate an e-mail or text message from server 202 to mobile computing device 214 that includes the unique payment link. Further, access may be provided by displaying a QR code on user interface 218 of kiosk 204 that is able to be scanned by mobile computing device 214 to automatically enable the unique payment link to initiate the payment process with payment processing system 232. When the unique payment link is used by mobile computing device 214 in accordance with any of the aforementioned options, user interface 218 may provide a visual indication to user 224 that the payment process is pending as seen in FIG. 5H. A status of the print order in server 202 may then be set to pending as it awaits a payment notification from payment processing system 232 that payment authorization has been obtained.

Figure 6H:
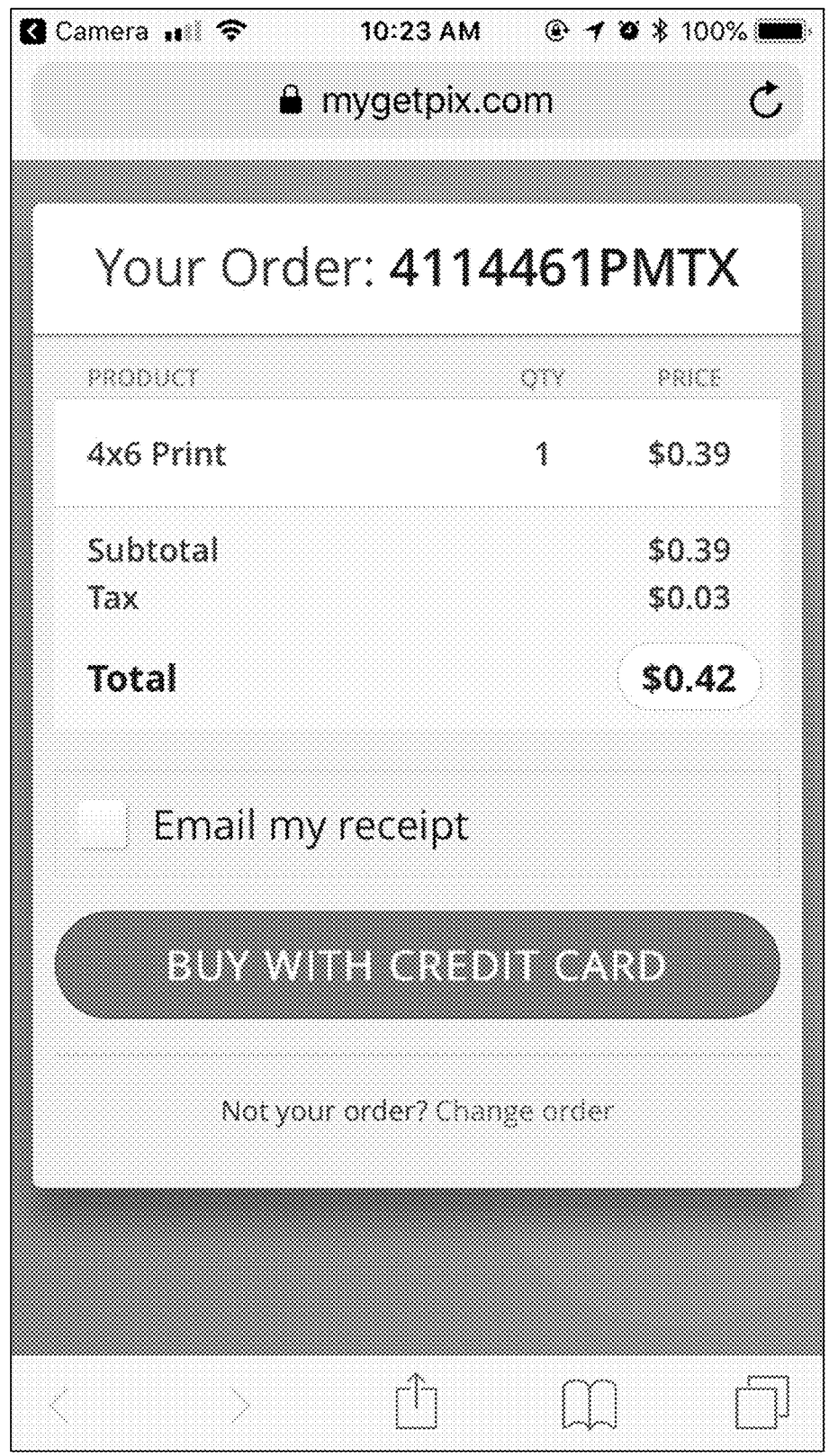
Figure 6I:
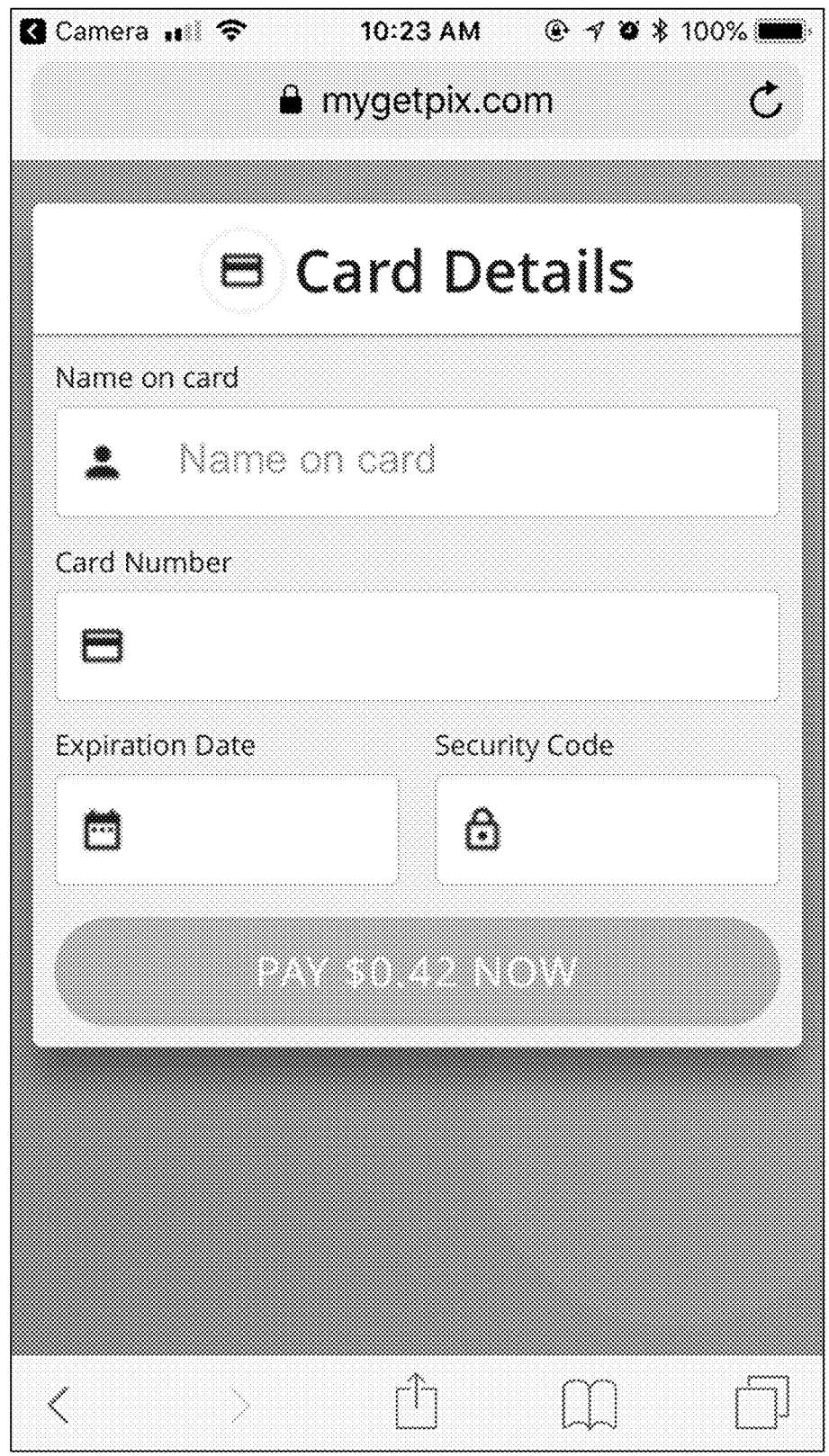
Figure 6J:
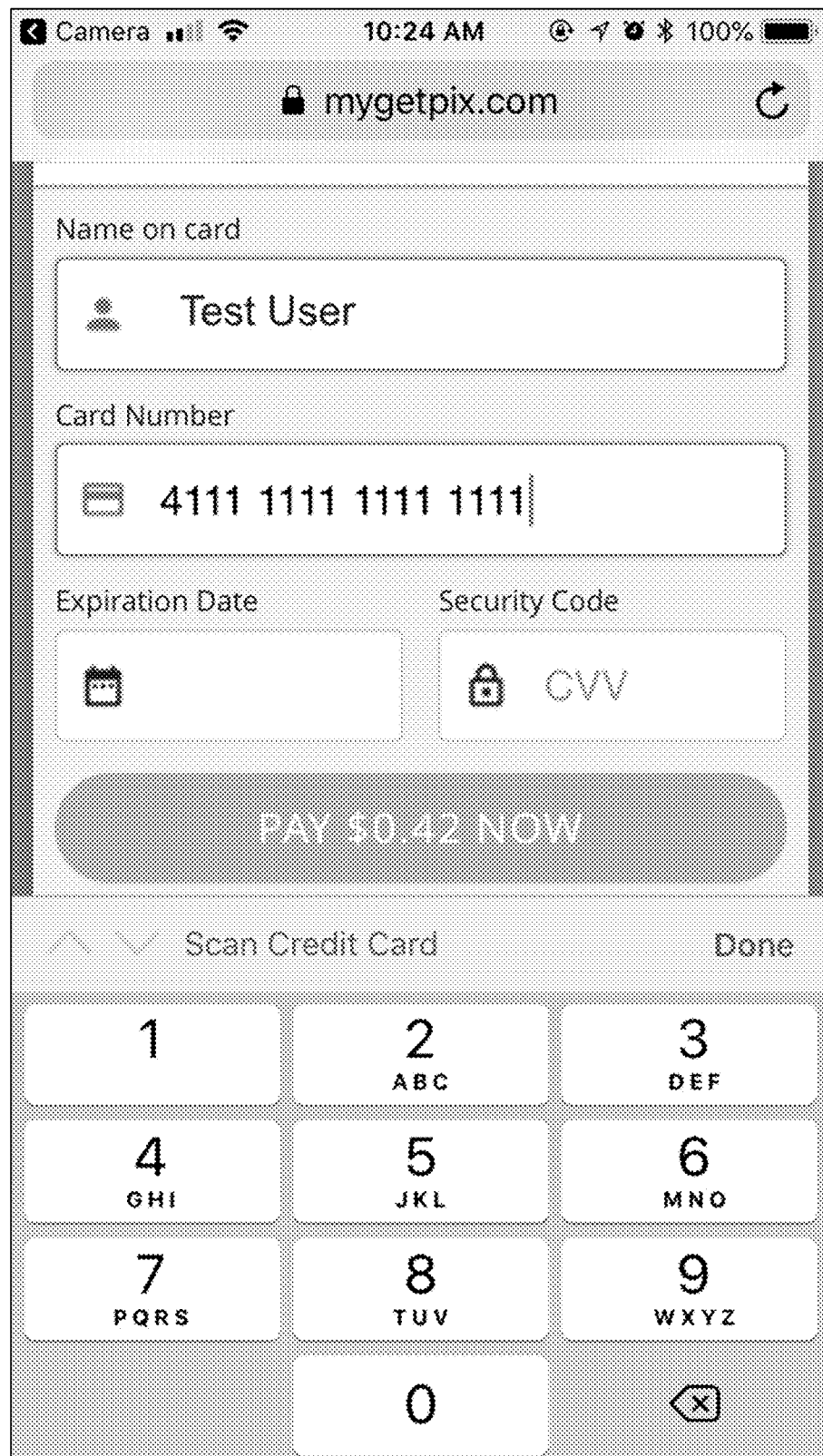
Figure 6K:
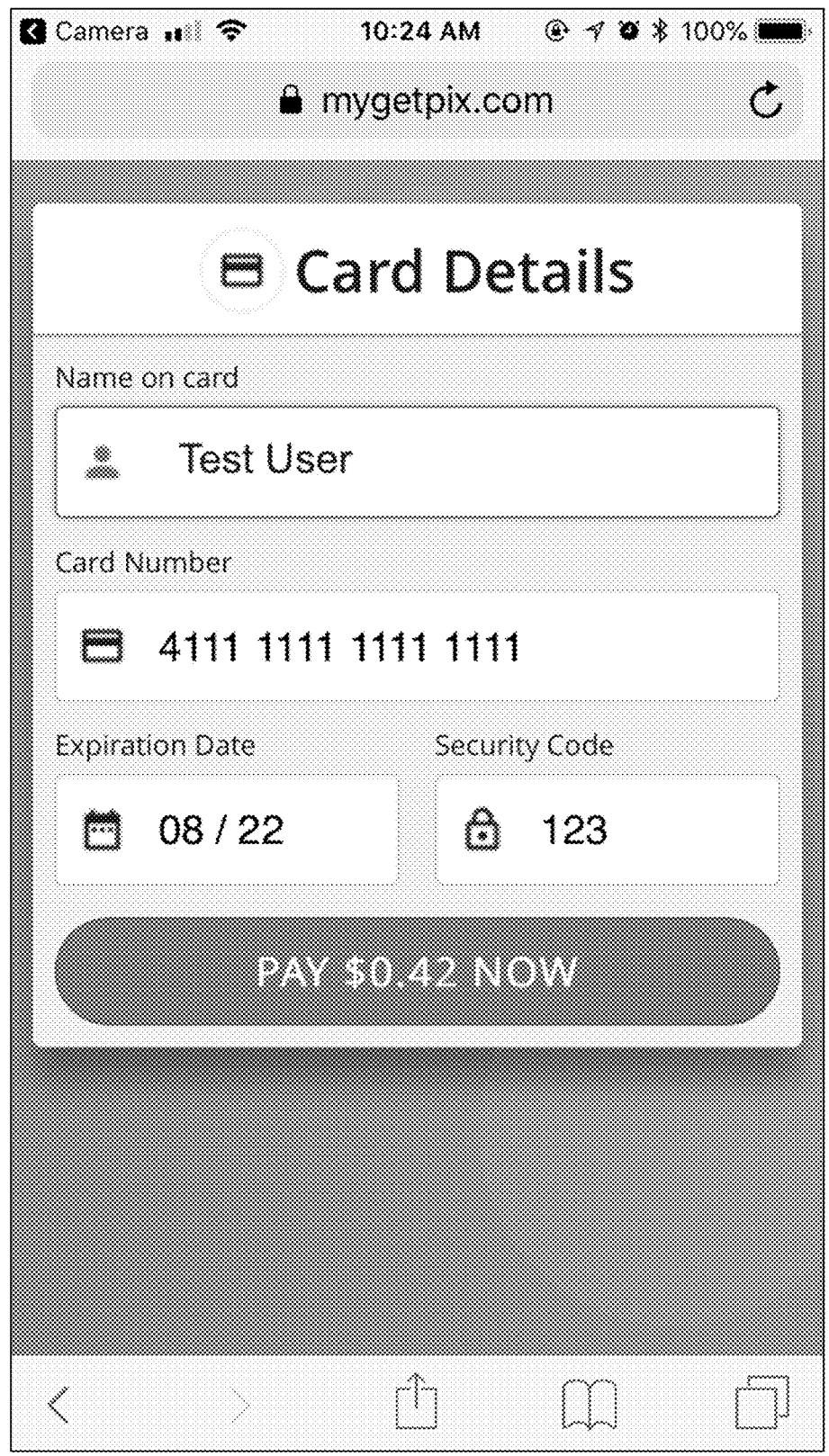

FIGS. 4 and 4A-4C illustrate an exemplary sequence showing the operations that may be provided when mobile computing device 214 uses the unique payment link to process payment for the print order. With reference to FIGS. 2-4 and 4A-4C, when mobile computing device 214 uses the unique payment link, a payment initiation notice may be sent to server 202 and a first one-use token ID is generated by server 202 that identifies the print order that was received so that server 202 is able to subsequently associate payment information received from payment processing system 232 to the respective print order. First token ID is provided to mobile computing device 214 at step 324. The different payment options (e.g., credit card, APPLE PAY, etc.) are then presented to user 224 on a display of mobile computing device 214 along with a summary of the print order at step 326, as seen in FIG. 6H. As seen in FIGS. 6I-6K, mobile computing device 214 is then used to enter and/or provide payment information (e.g., name, credit card number, credit card expiration date, CCV number, etc.) to payment processing system 232 at step 328, which may include personal identifiable information. The payment information is not provided to server 202 or kiosk 204. The payment processing system 232 associates the payment information to the print order using the first token ID provided by server 202. The payment processing system 232 then generates a second one-use token ID that represents, but does not include, the payment information that was made using mobile computing device 214. At step 330, the second token ID is then communicated from payment processing system 232 to mobile computing device 214. At step 332, mobile computing device 214 then communicates the second token ID, the first token ID, payment type and order total to server 202 so that server 202 can reconcile the payment request with the print order, and request that payment processing system 232 seek authorization for payment of the print order at step 334. During this time, kiosk 204 may send an inquiry to server 202 to check on the status of the print order to determine if the print order should be fulfilled. To this point, an inquiry by kiosk 204 would show the status of the print order at server 204 is "pending," which indicates that payment for the print order has not been authorized and kiosk 204 and/or photofinishing system 228 should not yet fulfil the print order.

Figure 6L:
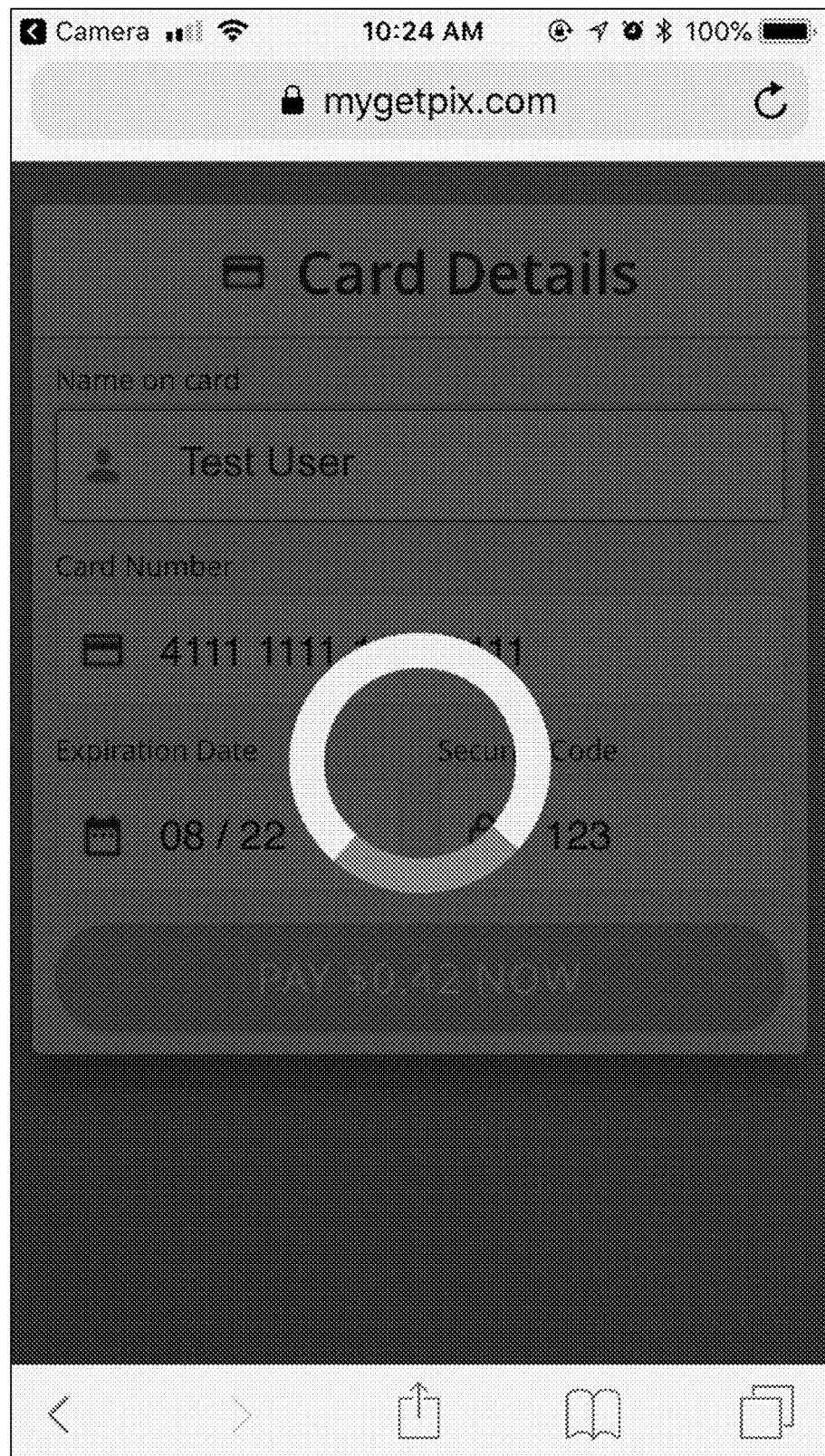

Payment processing system 232 then operates to seek authorization for payment for the print order based on the mechanism that was selected using mobile computing device 214, as seen in FIG. 6L. For example, if a credit card was used to pay for the print order, then payment processing system 232 may seek authorization through the use of an Automated Clearing House (ACH) transaction. It should be understood that other payment mechanisms may also be utilized in method 300. Once the payment for the print order is determined to be authorized by payment processing system 232, server 202 receives a payment notification from payment processing system 232 at step 336 indicating that a payment authorization has been received by payment processing system 232 through use of the unique payment link by mobile computing device 214. The payment authorization may be for an amount equal to the order cost. At this point, the payment has been authorized, but has not yet been finalized because the print order has not yet been fulfilled. Thus, the status of the print order at server 202 may be changed to "authorized" at step 338 to allow for fulfillment of the print order at step 340. However, it is contemplated that payment may be finalized at this stage of the process prior to the fulfillment of the print order.

Figure 5I:
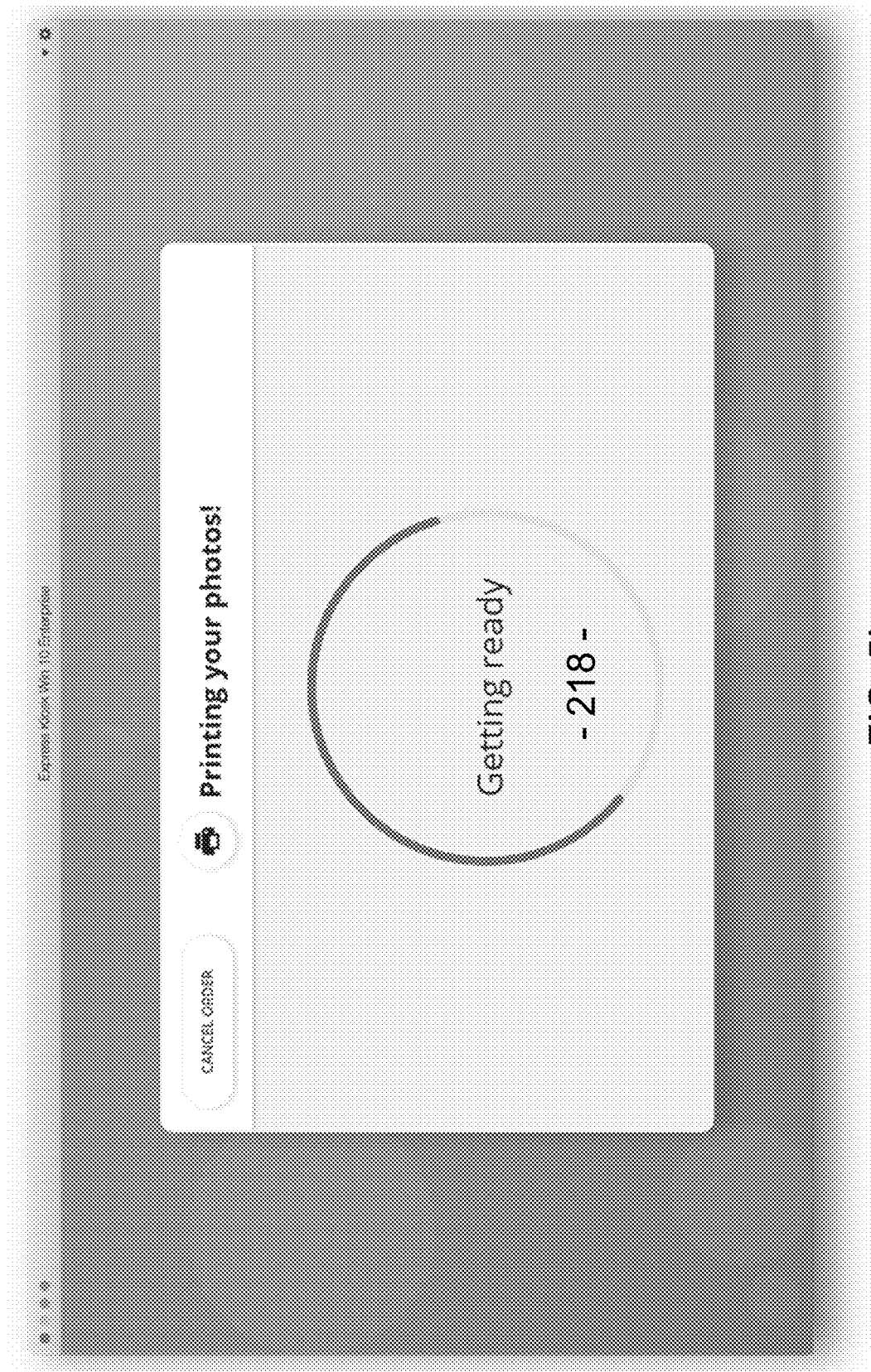
Figure 5J:
Figure 6M:
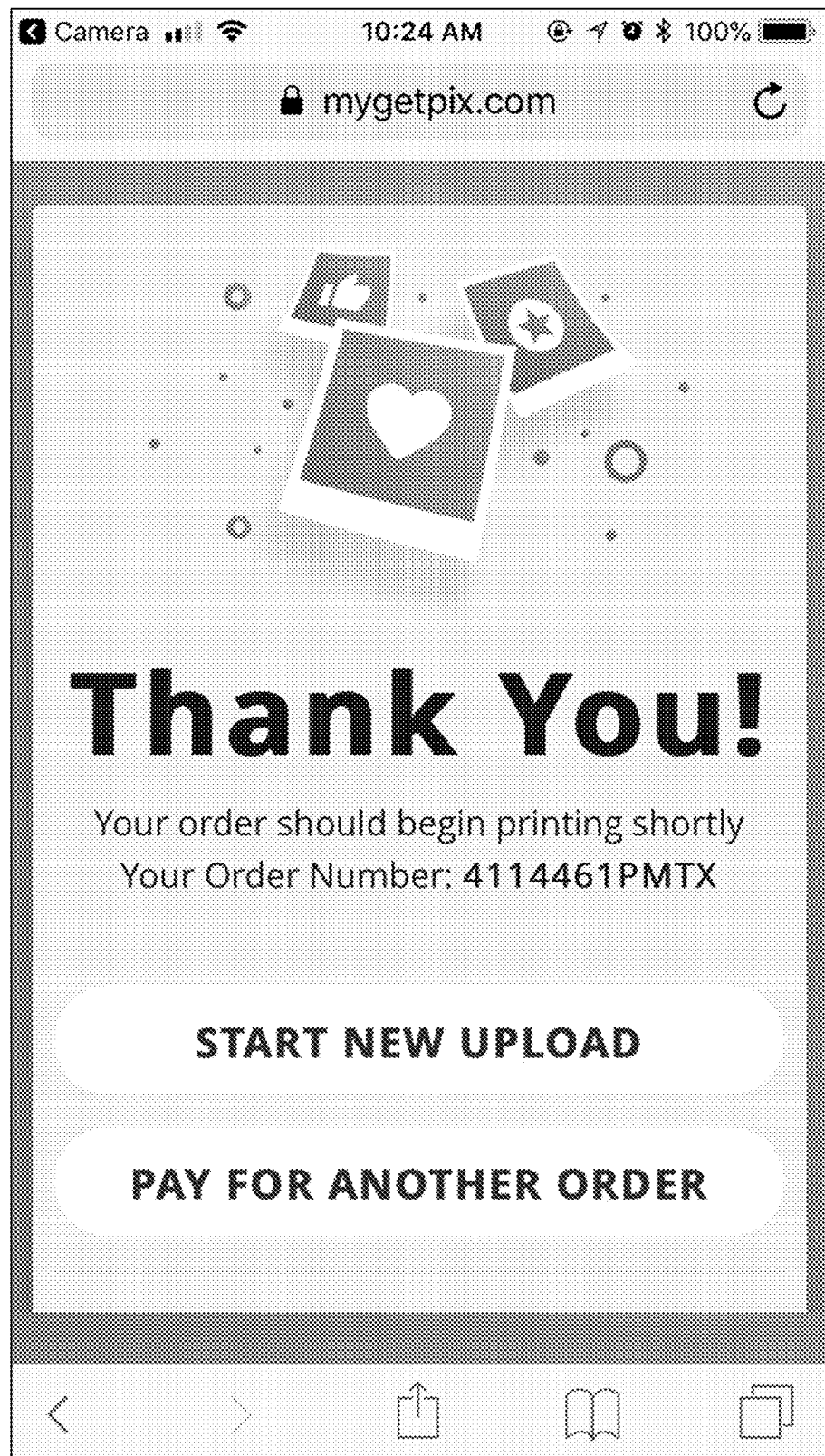

Kiosk 204 may send an inquiry to server 202 to determine if the status of the print order in server 202 changed from pending to authorized. Once the status has changed to authorized, the print order may be fulfilled by producing the specified print products using print device 226 of kiosk 204 and/or one or more printing devices 230 at photofinishing system 228. As seen in FIG. 6M, mobile computing device 214 may then provide information to the user on the display that the print order is being fulfilled. User interface 218 of kiosk 204 may also provide an indication to a user that the print order is in the process of being fulfilled, as seen in FIG. 5I. As previously discussed, the printing device that is used to produce the print products will depend on the capability of the printing devices and/or the substrates that are available to the printing devices. Once the print products have been produced by the kiosk 204 and/or photofinishing system 228, kiosk 204 may provide an indication to a user that the print order has been fulfilled, as seen in FIG. 5J. Further, a print completion notification is received at server 202 from kiosk 204 and/or photofinishing system 228 indicating the fulfillment of the print order at step 342. The status of the print order at server 202 may then be changed to "printed." At step 344, server 202 requests a final payment amount from payment processing system 232 and such payment is captured by payment processing and received by server 202 or send directly to a bank account owned or controlled by the first business entity. If all of the print products in the print order were fulfilled, then the final payment may be equal to the order cost. If the payment processing system 232 charges a processing fee for processing the payment for the print order, then the processing fee could be deducted from the final payment amount that is provided to server 202 or the bank account of the first business entity. It is contemplated that payment processing system 232 be paid its processing fee through other means as well, such as being paid directly by the user which would be added to the order cost at the time that payment is authorized by the user.

In another aspect, there could be an instance where the print order includes print products that are produced by kiosk 202 or photofinishing system 228 due to capabilities or substrate supply. In this instance, the final payment that is requested by server 202 to payment processing system 232 would only be for the print products that were actually produced even though the payment authorization was for the full order cost. This prevents the user from paying for print products that were not produced by kiosk 204 or photofinishing system 228.

In yet another aspect, the method 300 may include the ability to display multiple batches of digital images on kiosk 204 that were uploaded to server 202 at different times or by different people. For example, a user may have uploaded a first digital image to server 202 using a desktop computing device 212 at a certain time and received a first unique identifier from server 202 in accordance with steps 302-308. At a later time period, the user or some other person (e.g., family member, friend, etc.) may have uploaded a second digital image to server 202 using a respective mobile computing device 214 and received a second unique identifier from server 202 once again in accordance with steps 302-308. If the user wanted to display the first and second images on user interface 214 of kiosk 204 to select and order a print product including the first and second digital images, then the user would input the first unique identifier in accordance with steps 310-314 to display the first digital image, and then repeat these steps using the second unique identifier. The method would then proceed in accordance with the remaining steps in method 300.

In another aspect, it should be understood that the methods set forth above may be embodied in computer readable instructions stored on a non-transitory computer readable medium.

Having described the system and method of the present invention and an embodiment thereof, an exemplary computer environment for implementing the described design and execution is presented next.

Figure 7:
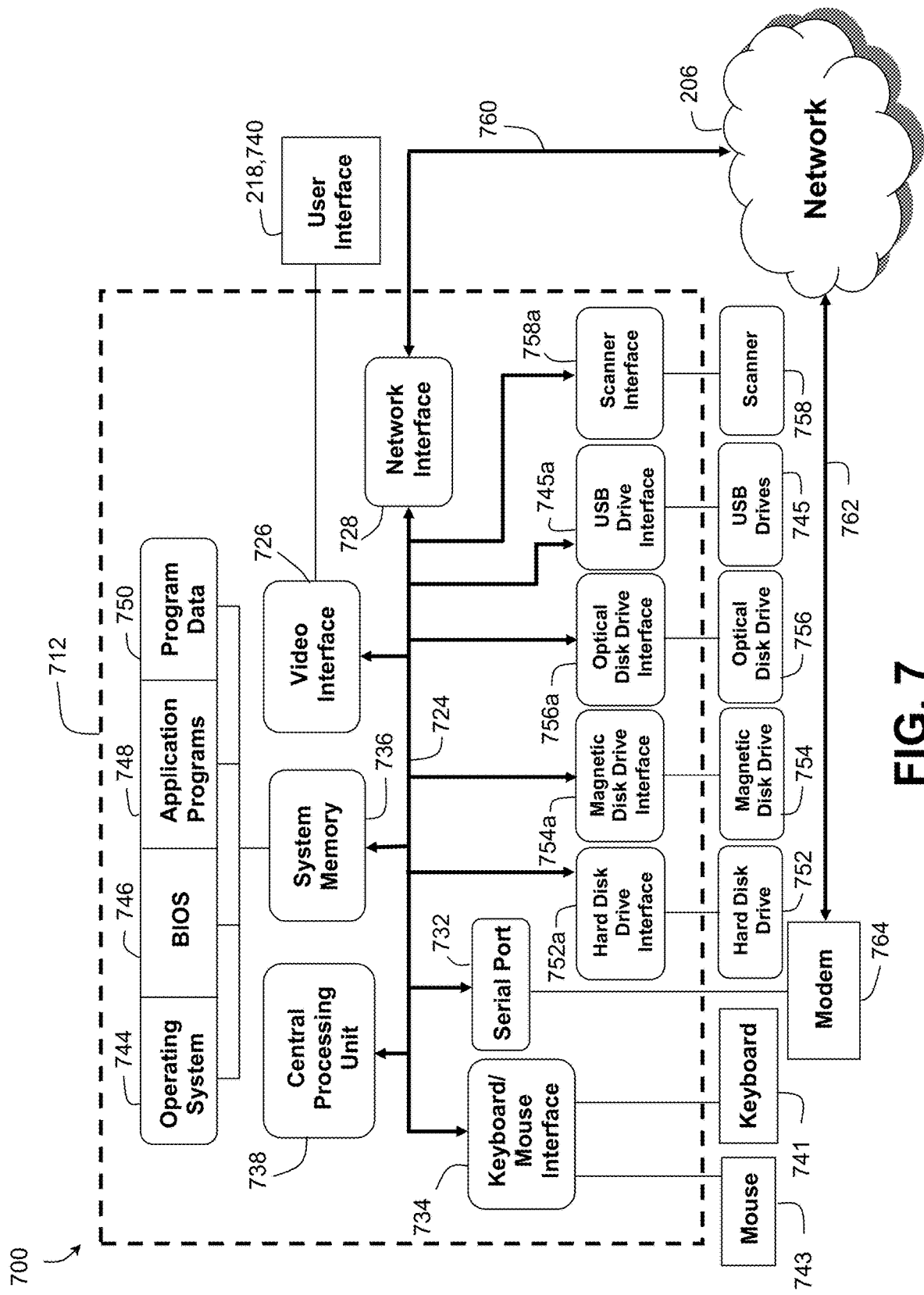
FIG. 7 is a block diagram generally illustrating a computing environment in which the invention may be implemented.

FIG. 7 shows an exemplary computing environment 700 that can be used to implement any of the processing thus far described. Computing environment 700 may include one or more computers 712 (such as server 202, kiosk 204, desktop computing device 212, mobile computing device 214, photofinishing system 228, payment processing system 232) comprising a system bus 724 that couples a video interface 726, network interface 728, a keyboard/mouse interface 734, and a system memory 736 to a Central Processing Unit (CPU) 738. A monitor or display 740 is connected to bus 724 by video interface 726 and provides the user with a graphical user interface to view, edit, and prepare a print order using digital images, including the selection of an identified substrate, or the selection a size and/or display location for a print product. The graphical user interface allows the user to enter commands and information into computer 712 using a keyboard 741 and a user interface selection device 743, such as a mouse, touch screen, or other pointing device. Keyboard 741 and user interface selection device 743 may be connected to bus 724 through keyboard/mouse interface 734. The display 740 and user interface selection device 743 are used in combination to form the graphical user interface which allows the user to implement at least a portion of the present invention. Other peripheral devices may be connected to the remote computer through universal serial bus (USB) drives 745 to transfer information to and from computer 712. For example, cameras and camcorders may be connected to computer 712 through serial port 732 or USB drives 745 so that data representative of a digital image or video may be downloaded to system memory 736 or another memory storage device associated with computer 712 such that the digital images may be subsequently printed on a substrate by one or more printing devices 226, 230.

The system memory 736 is also connected to bus 724 and may include read only memory (ROM), random access memory (RAM), an operating system 744, a basic input/output system (BIOS) 746, application programs 748 and program data 750. The computer 712 may further include a hard disk drive 752 for reading from and writing to a hard disk, a magnetic disk drive 754 for reading from and writing to a removable magnetic disk (e.g., floppy disk), and an optical disk drive 756 for reading from and writing to a removable optical disk (e.g., CD ROM or other optical media). The computer 712 may also include USB drives 745 and other types of drives for reading from and writing to flash memory devices (e.g., compact flash, memory stick/PRO and DUO, SD card, multimedia card, smart media xD card), and a scanner 758 for scanning items such as digital images to be downloaded to computer 712. A hard disk drive interface 752*a*, magnetic disk drive interface 754*a*, an optical drive interface 756*a*, a USB drive interface 745*a*, and a scanner interface 758*a* operate to connect bus 724 to hard disk drive 752, magnetic disk drive 754, optical disk drive 756, USB drive 745 and scanner 758, respectively. Each of these drive components and their associated computer-readable media may provide computer 712 with non-volatile storage of computer-readable instruction, program modules, data structures, application programs, an operating system, and other data for computer 712. In addition, it will be understood that computer 712 may also utilize other types of computer-readable media in addition to those types set forth herein, such as digital video disks, random access memory, read only memory, other types of flash memory cards, magnetic cassettes, and the like.

Computer 712 may operate in a networked environment using logical connections with each of the system components described above. Network interface 728 provides a communication path 760 between bus 724 and network 206, which allows, for example, a print order, digital image, unique payment link, unique identifier, input identifier, token ID, payment authorization, notification, inquiry, and the identified and selected substrate to be communicated through network 206 between the respective components of system 200. This type of logical network connection is commonly used in conjunction with a local area network (LAN). These items may also be communicated from bus 724 through a communication path 762 to network 206 using serial port 732 and a modem 764. Using a modem connection between the computer 712 and the other components of system 200 is commonly used in conjunction with a wide area network (WAN). It will be appreciated that the network connections shown herein are merely exemplary, and it is within the scope of the present invention to use other types of network connections between computer 712 and the other components of system 200 including both wired and wireless connections.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A computer-implemented method programmed for execution in a computing environment for ordering and facilitating payment of at least one print product, wherein the method is implemented utilizing a computing system including a processor, a memory and a user interface in communication with the processor, wherein the computing system is controlled by a first business entity, the method comprising:
   a) storing a digital image in the memory of the computing system;
   b) allowing for the selection of at least one print product using the user interface provided by a video interface of the computing system and accessed by a user computing device to establish a print order, wherein the at least one print product includes the digital image disposed thereon, and wherein the print order includes an identification of the selected at least one print product and an order cost to fulfill the print order;

c) generating a unique payment link by the processor that corresponds to the print order, wherein the unique payment link provides the user computing device with access to communicate payment information to a remote payment processing system over a network to provide payment for the print order, wherein the payment processing system is controlled by a second business entity, and wherein the payment information includes personal identifiable information;

d) providing access to the unique payment link to the user computing device;

e) receiving a payment notification at the processor from the remote payment processing system; and f) allowing for the fulfillment of at least a portion of the print order using a printing device.

2. A method in accordance with claim 1, wherein the user computing device comprises a user mobile computing device.

3. A method in accordance with claim 1, further comprising receiving an inquiry at the processor from the user computing device related to the receipt of the payment notification prior to allowing for the fulfillment of the print order using the printing device, wherein the payment notification indicates that a payment authorization has been received by the remote payment processing system through use of the unique payment link by the user computing device, wherein the payment authorization is for an amount equal to the order cost.

4. A method in accordance with claim 3, wherein a final payment amount is requested from the payment processing system after the fulfillment of the print order by the printing device, wherein the final payment amount is based on the portion of the print order that was fulfilled by the printing device up to the amount equal to the order cost.

5. A method in accordance with claim 1, further comprising:

receiving a payment initiation notice at the processor that the user computing device has utilized the unique payment link to initiate payment with the payment processing system; and receiving an inquiry at the processor from the user interface related to the receipt of the payment initiation notice.

6. A method in accordance with claim 1, wherein providing the unique payment link includes communicating at least one of:

an e-mail to the user computing device from the processor upon receiving a request from the user computing device;

a text message to the user computing device from the processor upon receiving a request from the user computing device; or the unique payment link to the user computing device so that the unique payment link is displayed on the user interface accessed by the user computing device.

7. A method in accordance with claim 1, wherein the computing system comprises a computing device and wherein the computing device is a print product ordering server.

8. A computing system for ordering and facilitating payment of at least one print product, wherein the computing system is controlled by a first business entity, the computing system comprising:

a processor;

a memory; and a user interface in communication with the processor;

wherein the computing system is configured for:

a) storing a digital image in the memory;

b) allowing for the selection of at least one print product using the user interface provided by a video interface of the computing system and accessed by a user computing device to establish a print order, wherein the at least one print product includes the digital image disposed thereon, and wherein the print order includes an identification of the selected at least one print product and an order cost to fulfill the print order;

c) generating a unique payment link by the processor that corresponds to the print order, wherein the unique payment link provides the user computing device with access to communicate payment information to a remote payment processing system over a network to provide payment for the print order, wherein the payment processing system is controlled by a second business entity, and wherein the payment information includes personal identifiable information;

d) providing access to the unique payment link to the user computing device;

e) receiving a payment notification at the processor from the remote payment processing system; and f) allowing for the fulfillment of at least a portion of the print order using a printing device.

9. A computing system in accordance with claim 8, wherein the user computing device comprises a user mobile computing device.

10. A computing system in accordance with claim 9, wherein the computing system is further configured for receiving an inquiry at the processor from the user computing device related to the receipt of the payment notification prior to allowing for the fulfillment of the print order using the printing device, wherein the payment notification indicates that a payment authorization has been received by the remote payment processing system through use of the unique payment link by the user computing device, wherein the payment authorization is for an amount equal to the order cost.

11. A computing system in accordance with claim 10, wherein a final payment amount is requested from the payment processing system after the fulfillment of the print order by the printing device, wherein the final payment amount is based on the portion of the print order that was fulfilled by the printing device up to the amount equal to the order cost.

12. A computing system in accordance with claim 9, wherein the computing system is further configured for:

receiving a payment initiation notice at the processor that the user computing device has utilized the unique payment link to initiate payment with the payment processing system; and receiving an inquiry at the processor from the user interface related to the receipt of the payment initiation notice.

13. A computing system in accordance with claim 8, wherein providing the unique payment link includes communicating at least one of:

an e-mail to the user computing device from the processor upon receiving a request from the user computing device;

a text message to the user computing device from the processor upon receiving a request from the user computing device; or the unique payment link to the user computing device so that the unique payment link is displayed on the user interface accessed by the user computing device.

14. A computing system in accordance with claim 8, wherein the computing system comprises a computing device and wherein the computing device is a print product ordering server.

15. A non-transitory computer readable medium having thereon computer executable instructions for executing a method in a computing environment for ordering and facilitating payment of at least one print product, wherein the method is implemented utilizing a processor and a memory, wherein the computing system is controlled by a first business entity, the method comprising:
   a) storing a digital image in the memory of the computing system;
   b) allowing for the selection of at least one print product using a user interface provided by a video interface of the computing system and accessed by a user computing device to establish a print order, wherein the at least one print product includes the digital image disposed thereon, and wherein the print order includes an identification of the selected at least one print product and an order cost to fulfill the print order;
   c) generating a unique payment link by the processor that corresponds to the print order, wherein the unique payment link provides the user computing device with access to communicate payment information to a remote payment processing system over the network to provide payment for the print order, wherein the payment processing system is controlled by a second business entity, and wherein the payment information includes personal identifiable information;
   d) providing access to the unique payment link to the user computing device;
   e) receiving a payment notification at the processor from the remote payment processing system; and
   f) allowing for the fulfillment of at least a portion of the print order using a printing device.

16. A non-transitory computer readable medium in accordance with claim 15, wherein the user computing device comprises a user mobile computing device.

17. A non-transitory computer readable medium in accordance with claim 15, wherein the method further comprises receiving an inquiry from the user computing device related to the receipt of the payment notification prior to allowing for the fulfillment of the print order using the printing device,
   wherein the payment notification indicates that a payment authorization has been received by the remote payment processing system through use of the unique payment link by the user computing device, wherein the payment authorization is for an amount equal to the order cost.

18. A non-transitory computer readable medium in accordance with claim 17, wherein a final payment amount is requested from the payment processing system after the fulfillment of the print order by the printing device, wherein the final payment amount is based on the portion of the print order that was fulfilled by the printing device up to the amount equal to the order cost.

19. A non-transitory computer readable medium in accordance with claim 15, further comprising:
   receiving a payment initiation notice at the processor that the user computing device has utilized the unique payment link to initiate payment with the payment processing system; and
   receiving an inquiry at the processor from the user interface related to the receipt of the payment initiation notice.

20. A non-transitory computer readable medium in accordance with claim 15, wherein providing the unique payment link includes communicating at least one of:
   an e-mail to the user computing device from the processor upon receiving a request from the user computing device;
   a text message to the user computing device from the processor upon receiving a request from the user computing device; or
   the unique payment link to the user computing device so that the unique payment link is displayed on the user interface accessed by the user computing device.

21. A non-transitory computer readable medium in accordance with claim 15, wherein the computing system comprises a computing device and wherein the computing device is a print product ordering server.

22. A computer-implemented method programmed for execution in a computing environment for ordering and facilitating payment of at least one print product, wherein the method is implemented utilizing a computing system including a processor and a memory, wherein the computing system is controlled by a first business entity, the method comprising:
   a) storing a digital image in the memory of the computing system;
   b) allowing for the selection of at least one print product using a user computing device in communication with the processor to establish a print order, wherein the at least one print product includes the digital image disposed thereon, and wherein the print order includes an identification of the selected at least one print product and an order cost to fulfill the print order;
   c) generating a unique payment link by the processor that corresponds to the print order, wherein the unique payment link provides the user computing device with access to communicate payment information to a remote payment processing system over a network to provide payment for the print order, wherein the payment processing system is controlled by a second business entity, and wherein the payment information includes personal identifiable information;
   d) providing access to the unique payment link to the user computing device;
   e) receiving a payment notification at the processor from the remote payment processing system; and
   f) allowing for the fulfillment of at least a portion of the print order using a printing device.

\* \* \* \* \*